US010496157B2

(12) United States Patent
Steedly et al.

(10) Patent No.: US 10,496,157 B2
(45) Date of Patent: Dec. 3, 2019

(54) CONTROLLING HANDHELD OBJECT LIGHT SOURCES FOR TRACKING

(71) Applicant: Microsoft Technology Licensing, LLC, Redmond, WA (US)

(72) Inventors: Drew Steedly, Redmond, WA (US); Alexandru Octavian Balan, Sammamish, WA (US); Taras Khapko, Belgrade (RS); Ivan Razumenic, Belgrade (RS); Steven James Velat, Kirkland, WA (US); Vladimir Carapic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/826,490

(22) Filed: Nov. 29, 2017

(65) Prior Publication Data

US 2018/0329517 A1    Nov. 15, 2018

Related U.S. Application Data

(60) Provisional application No. 62/503,673, filed on May 9, 2017.

(51) Int. Cl.
*G06F 3/01* (2006.01)
*G06T 7/73* (2017.01)
(Continued)

(52) U.S. Cl.
CPC ............ *G06F 3/012* (2013.01); *A63F 13/211* (2014.09); *A63F 13/213* (2014.09);
(Continued)

(58) Field of Classification Search
CPC .... A63F 13/211; A63F 13/212; A63F 13/213; A63F 13/22; A63F 13/235; A63F 13/24;
(Continued)

(56) References Cited

U.S. PATENT DOCUMENTS 5,557,981 A    9/1996 Neal et al.
8,323,106 B2 *  12/2012 Zalewski ............. G06F 3/0304
463/31

(Continued)

OTHER PUBLICATIONS

Bleser, Gabriele, "Towards Visual Inertial SIA for Mobile Augmented Reality", In Doctoral Thesis at Technischen University, Kaiserslaitem, Mar. 24, 2009, 188 Pages.
(Continued)

*Primary Examiner* — Tony O Davis
(74) *Attorney, Agent, or Firm* — Alleman Hall Creasman & Tuttle LLP

(57) ABSTRACT

Examples are disclosed herein related to tracking poses of a head-mounted display device that interfaces with handheld peripheral objects. One disclosed example provides a handheld object configured for providing user input to a head-mounted device, the handheld object including a body, a plurality of visible light sources arranged on the body in an arrangement trackable by a vision system of the head-mounted device, and a controller configured to control a brightness of one or more visible light sources of the plurality of visible light sources.

18 Claims, 25 Drawing Sheets

(51) Int. Cl.

| | |
|---|---|
| G06T 7/285 | (2017.01) |
| G06T 7/246 | (2017.01) |
| G06T 7/80 | (2017.01) |
| A63F 13/53 | (2014.01) |
| A63F 13/213 | (2014.01) |
| A63F 13/211 | (2014.01) |
| A63F 13/235 | (2014.01) |
| A63F 13/80 | (2014.01) |
| A63F 13/92 | (2014.01) |
| G01C 19/5776 | (2012.01) |
| G01J 1/44 | (2006.01) |
| F21V 23/04 | (2006.01) |
| G02B 27/01 | (2006.01) |
| G06F 3/03 | (2006.01) |
| G06F 3/0346 | (2013.01) |
| G06F 3/038 | (2013.01) |
| H05B 33/08 | (2006.01) |
| G01B 11/00 | (2006.01) |
| G01D 5/26 | (2006.01) |
| G06T 7/70 | (2017.01) |
| H04N 13/204 | (2018.01) |

(52) U.S. Cl.
CPC ............ *A63F 13/235* (2014.09); *A63F 13/53* (2014.09); *A63F 13/80* (2014.09); *A63F 13/92* (2014.09); *F21V 23/0471* (2013.01); *G01B 11/002* (2013.01); *G01C 19/5776* (2013.01); *G01D 5/26* (2013.01); *G01J 1/44* (2013.01); *G02B 27/0172* (2013.01); *G06F 3/038* (2013.01); *G06F 3/0308* (2013.01); *G06F 3/0346* (2013.01); *G06T 7/248* (2017.01); *G06T 7/285* (2017.01); *G06T 7/74* (2017.01); *G06T 7/80* (2017.01); *G06T 7/85* (2017.01); *H05B 33/0854* (2013.01); *A63F 2300/8082* (2013.01); *G02B 2027/014* (2013.01); *G02B 2027/0138* (2013.01); *G06T 7/70* (2017.01); *G06T 2207/10021* (2013.01); *G06T 2207/10152* (2013.01); *G06T 2207/20076* (2013.01); *G06T 2207/30244* (2013.01); *H04N 13/204* (2018.05)

(58) Field of Classification Search
CPC ........ A63F 13/31; A63F 13/42; A63F 13/428; A63F 13/53; A63F 13/80; A63F 13/92; A63F 2300/8082; F21V 23/0471; G01B 11/002; G01C 19/5776; G01D 5/26; G01J 1/44; G02B 2027/0138; G02B 2027/014; G02B 2027/0187; G02B 27/017; G02B 27/0172; G06F 2203/0382; G06F 3/011; G06F 3/012; G06F 3/017; G06F 3/0308; G06F 3/0325; G06F 3/033; G06F 3/0346; G06F 3/038; G06F 3/04815; G06T 2207/10021; G06T 2207/10152; G06T 2207/20076; G06T 2207/30244; G06T 7/248; G06T 7/285; G06T 7/70; G06T 7/73; G06T 7/74; G06T 7/80; G06T 7/85; H04N 13/204; H04N 13/239; H04N 13/246; H04N 13/254; H05B 33/0854; H05B 37/0218; H05B 37/0227; H05B 37/0272
USPC ........................................................ 345/633
See application file for complete search history.

(56) References Cited

U.S. PATENT DOCUMENTS

| | | | |
|---|---|---|---|
| 9,031,809 B1 * | 5/2015 | Kumar ................. | G01C 21/165 |
| | | | 702/150 |
| 9,208,566 B2 | 12/2015 | Chen et al. | |
| 9,788,714 B2 | 10/2017 | Krueger | |
| 9,851,787 B2 | 12/2017 | Latta et al. | |
| 2002/0105484 A1 * | 8/2002 | Navab .................. | G02B 27/017 |
| | | | 345/8 |
| 2005/0105772 A1 | 5/2005 | Voronka et al. | |
| 2006/0277571 A1 * | 12/2006 | Marks ..................... | A63F 13/00 |
| | | | 725/37 |
| 2007/0081695 A1 * | 4/2007 | Foxlin ....................... | G06T 7/73 |
| | | | 382/103 |
| 2010/0259471 A1 * | 10/2010 | Takano ................ | G02B 27/017 |
| | | | 345/156 |
| 2014/0049629 A1 | 2/2014 | Siewerdsen et al. | |
| 2014/0228124 A1 | 8/2014 | Plagge et al. | |
| 2014/0293038 A1 * | 10/2014 | Delmonico .......... | H04N 5/2256 |
| | | | 348/82 |
| 2016/0054797 A1 | 2/2016 | Tokubo et al. | |
| 2016/0140930 A1 * | 5/2016 | Pusch ..................... | G06F 3/011 |
| | | | 345/633 |
| 2016/0171771 A1 * | 6/2016 | Pedrotti ............... | G02B 27/017 |
| | | | 345/633 |
| 2016/0307332 A1 | 10/2016 | Ranjan et al. | |
| 2016/0364910 A1 | 12/2016 | Higgins et al. | |
| 2017/0011553 A1 * | 1/2017 | Chen ....................... | G06F 3/005 |
| 2017/0192495 A1 * | 7/2017 | Drinkwater ............. | G06F 3/011 |
| 2017/0220119 A1 * | 8/2017 | Potts ....................... | G06F 3/017 |
| 2018/0097975 A1 | 4/2018 | Osman | |

OTHER PUBLICATIONS

"International Search Report and Written Opinion Issued in PCT Application No. PCT/US18/028718", dated Jul. 20, 2018, 14 Pages.
"International Search Report and Written Opinion Issued in US Patent Application No. PCT/US18/028719", dated Jul. 11, 2018, 17 Pages.
"International Search Report and Written Opinion Issued in PCT Application No. PCT/US18/028721", dated Jul. 12, 2018, 15 Pages.
"International Search Report and Written Opinion Issued in PCT Application No. PCT/US18/028726", dated Jul. 27, 2018, 15 Pages.
Xu, Q Y., et al., "Camera Calibration of Stereo Photogrammetric System with One-Dimensional Optical Reference Bar", In Journal of Physics, vol. 48 , No. 1, Aug. 12, 2006, 5 Pages.
Yuan, Chunrong, "Markerless Pose Tracking for Augmented Reality", Advances in Visual Computing Lecture Notes in Computer Sciences, Nov. 8, 2016, 10 Pages.
Li, et al., "Epsilon: A Visible Light Based Positioning System", In Proceedings of the 11th USENIX Conference on Networked Systems Design and Implementation, Apr. 2, 2014, pp. 1-13.
Parrish, Kevin, "iFixit tears apart the Rift's Oculus Constellation sensor, and it's not pretty", Retrieved From: «https://www.digitaltrends.com/virtual-reality/ifixit-oculus-constellation/», Apr. 18, 2016, 4 Pages.
Li, et al., "Handheld pose tracking using vision-inertial sensors with occlusion handling", In Journal of Electronic Imaging vol. 25, Issue 4, Jul. 2016, 16 Pages.
Chow, Yang-Wai, "Low-Cost Multiple Degrees-of-Freedom Optical Tracking for 3D Interaction in Head-Mounted Display Virtual Reality", In International Journal of Recent Trends in Engineering and Technology, vol. 1, No. 1, Nov. 2009, pp. 52-56.
Boyali, et al., "Real Time Six Degree of Freedom Pose Estimation Using Infrared Light Sources and Wiimote IR Camera with 3D TV Demonstration", In Proceedings of International ICST Conference on Mobile and Ubiquitous Systems, Dec. 6, 2010, pp. 137-148.
"Non Final Office Action Issued in U.S. Appl. No. 15/826,452", dated Nov. 6, 2018, 9 Pages.
"Non Final Office Action Issued in U.S. Appl. No. 15/826,575", dated Jan. 25, 2019, 10 Pages,

(56) References Cited

OTHER PUBLICATIONS

"Final Office Action Issued in U.S. Appl. No. 15/826,452", dated May 7, 2019, 9 Pages.
"Non Final Office Action Issued in U.S. Appl. No. 15/826,452", dated Sep. 3, 2019, 9 Pages.
"Non Final Office Action Issued in U.S. Appl. No. 15/826,560", dated Aug. 28, 2019, 9 Pages.

* cited by examiner

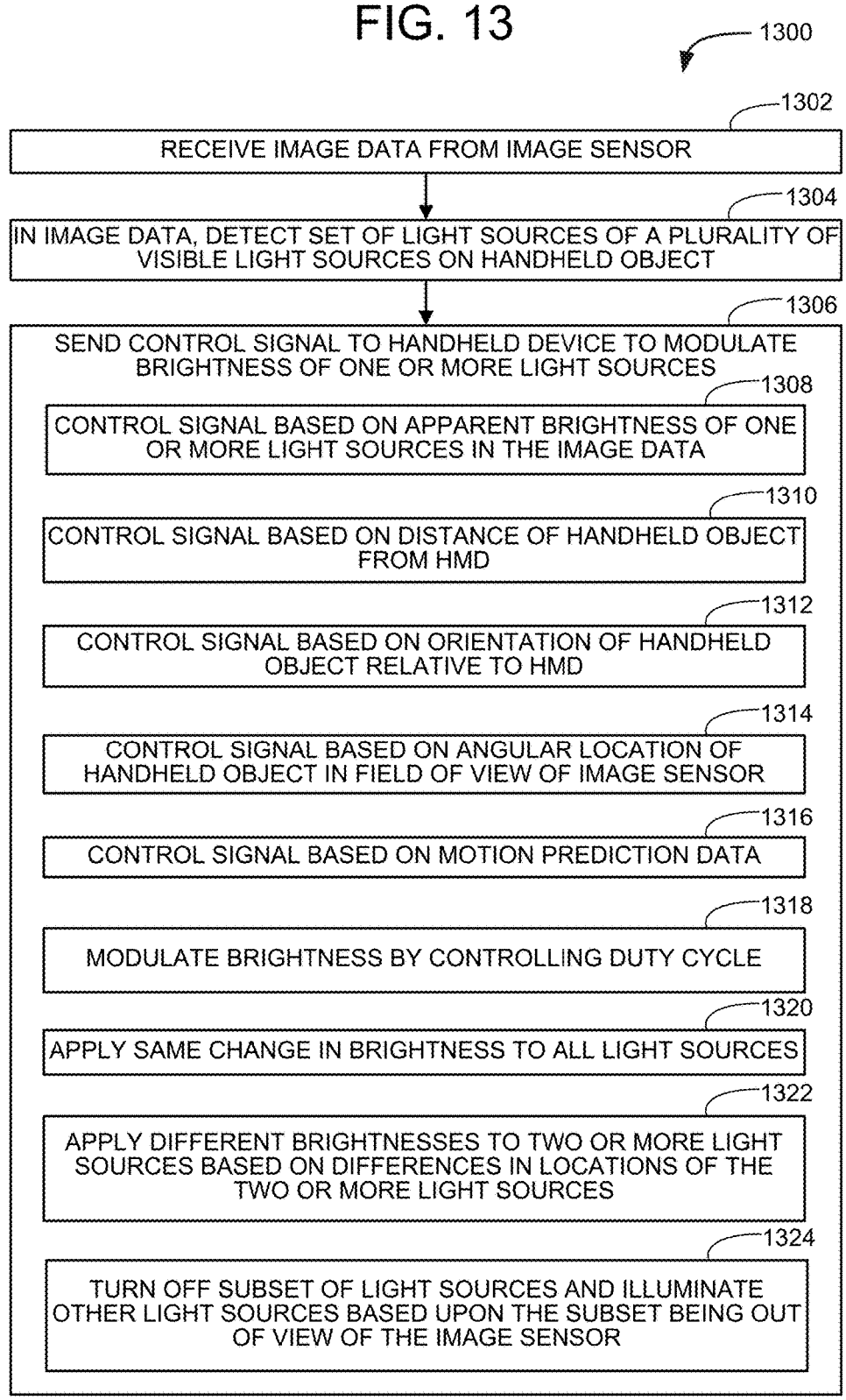

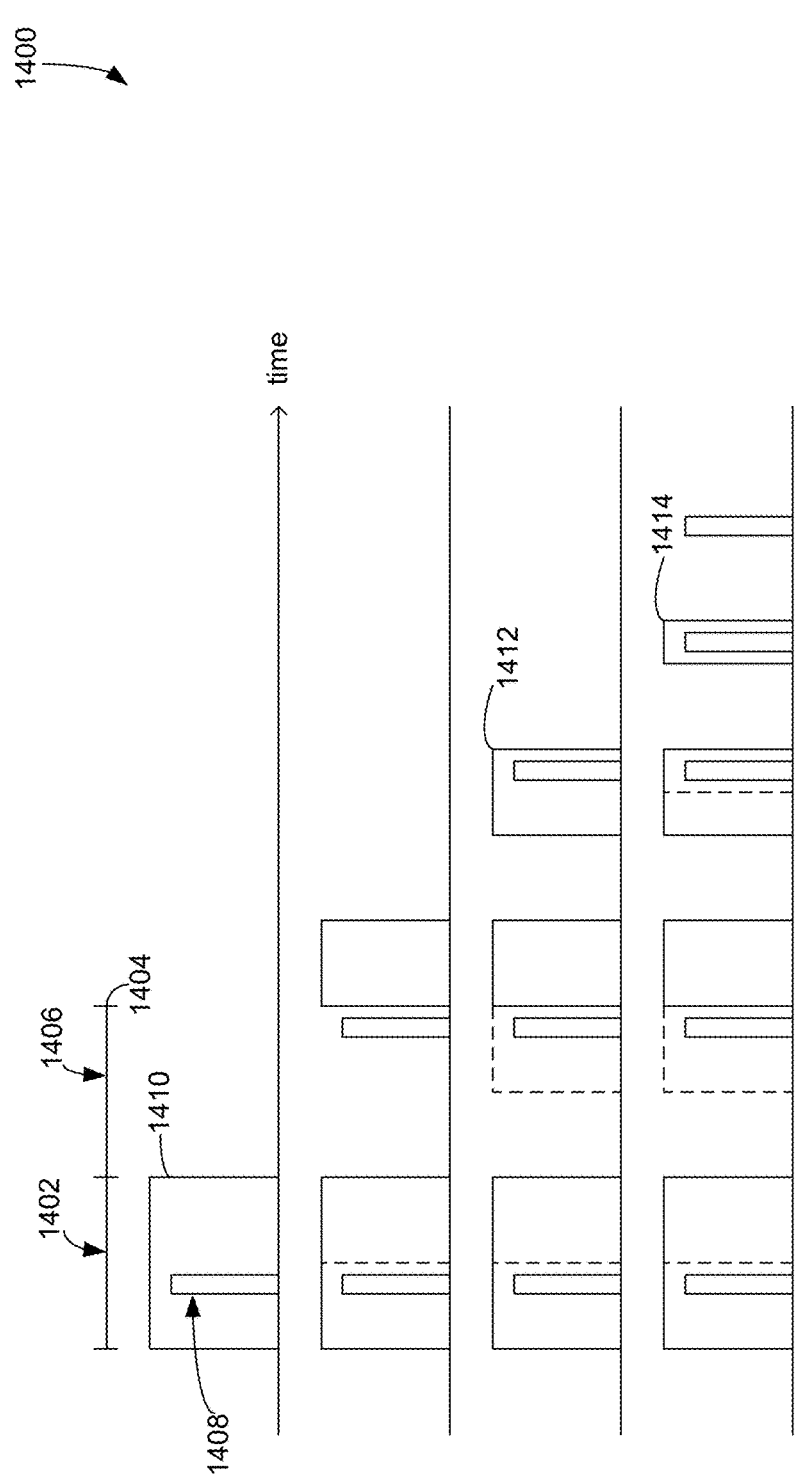

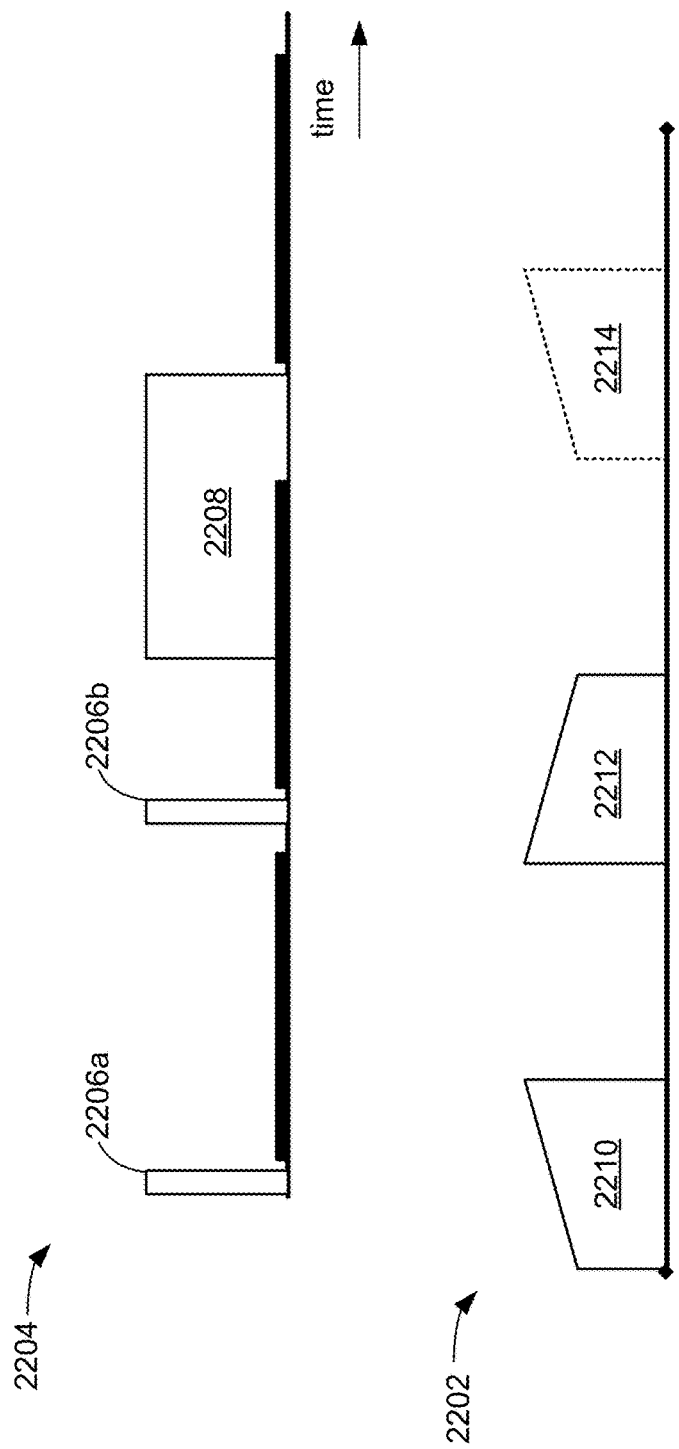

CONTROLLING HANDHELD OBJECT LIGHT SOURCES FOR TRACKING

CROSS REFERENCE TO RELATED APPLICATIONS

This application claims priority to U.S. Provisional Patent Application Ser. No. 62/503,673, filed May 9, 2017, the entirety of which is hereby incorporated herein by reference for all purposes.

BACKGROUND

Motion may be tracked as computing device input via data from various sensors, such as image sensors and inertial sensors.

SUMMARY

One disclosed example provides a handheld object configured for providing user input to a head-mounted device, the handheld object including a body, a plurality of visible light sources arranged on the body in an arrangement trackable by a vision system of the head-mounted device, and a controller configured to control a brightness of one or more visible light sources of the plurality of visible light sources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 13 shows a flow diagram illustrating an example method of adjusting light source brightness.

FIG. 14A-14B show an example binary search method for optical time synchronization.

FIG. 22 schematically shows an example light pulse cycle and an example exposure sequence.

DETAILED DESCRIPTION

This application discloses examples related to computing systems comprising head-mounted display devices (HMDs) that interface with handheld controllers and/or other handheld peripheral objects, e.g. as parts of a gaming system. To make a gaming experience more immersive, the poses of a HMD and a handheld controller may be tracked as the devices are moved through space by a user to provide inputs to control a user interface of the HMD. Such pose tracking also may be used for other computing device interactions than gaming.

Figure 1:
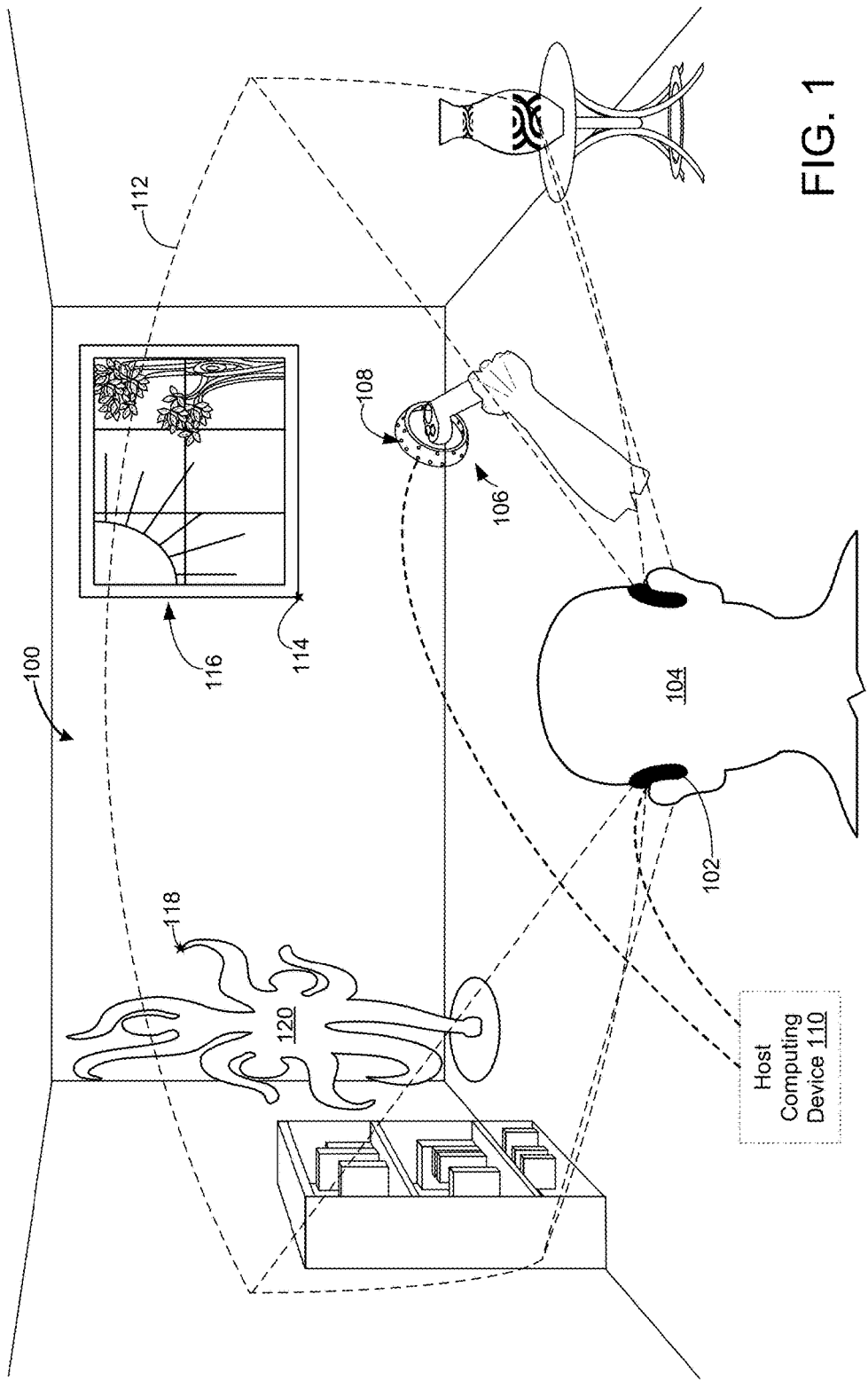
FIG. 1 shows an example use scenario in which poses of a wearable device and handheld object may be tracked as computing device input.
Figure 2:
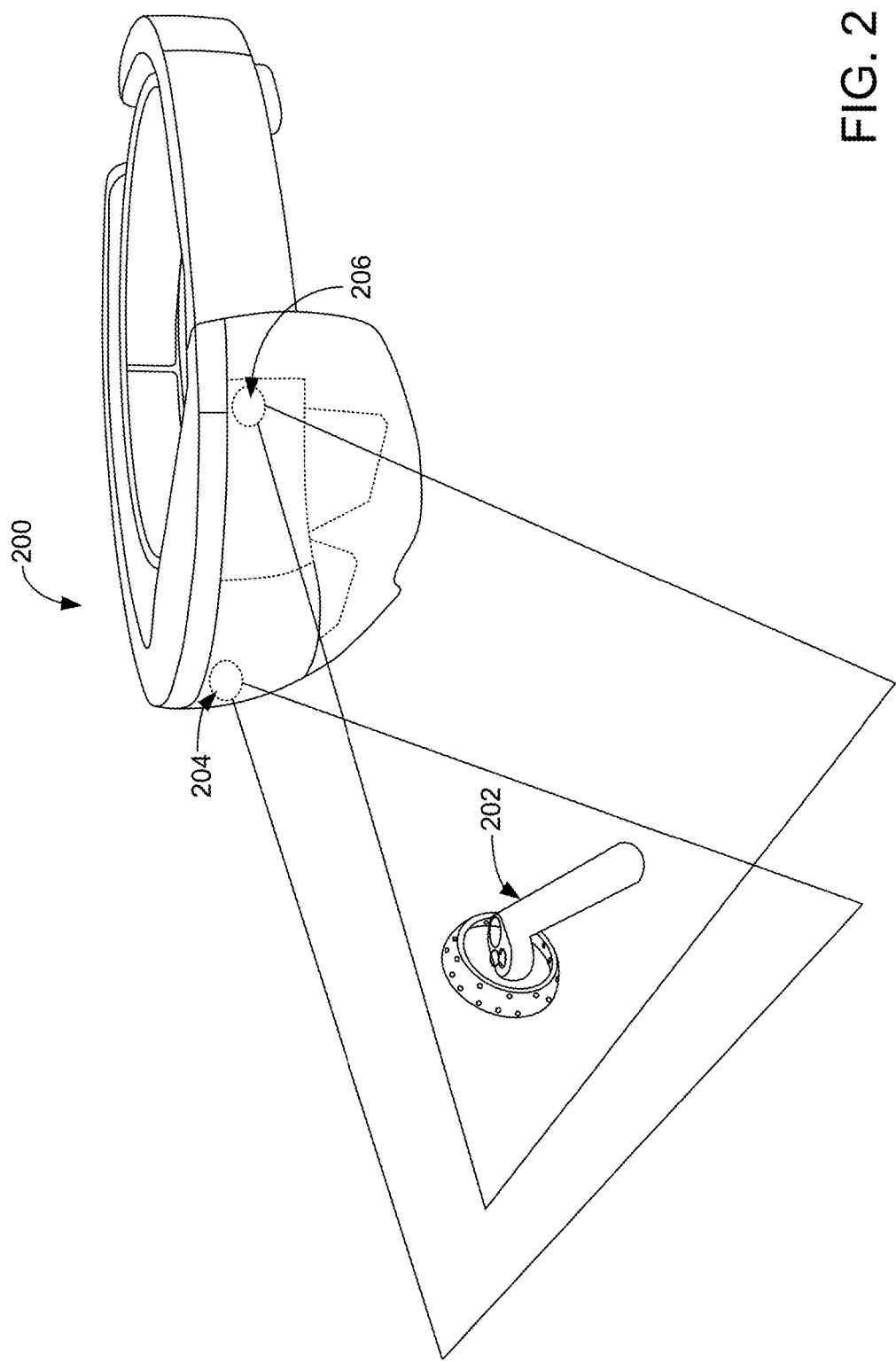
FIG. 2 shows an example wearable device imaging a handheld object.

The disclosed examples may utilize cameras, such as a stereo camera arrangement, on the HMD for tracking a handheld object, such as a game controller. This avoids the use of external light sources and/or cameras placed elsewhere in the surrounding environment for tracking of the handheld controller, which would have to be set up in the use environment prior to use. FIG. 1 shows an example scenario 100 in which a HMD 102, worn by a user 104, displays virtual and/or augmented reality imagery. One or more outward-facing cameras on the HMD 102 may acquire image data (e.g. visible light image data) of the surrounding environment and of a handheld object 106 held by the user 102. For example, FIG. 2 shows an example HMD 200 imaging a handheld object 202 using a stereo camera imaging system (indicated by first camera 204 and second camera 206).

The term "handheld object" is used herein for an object comprising trackable light sources 108 that may be held by hand as described herein, and signifies that the object may be handheld, whether or not the object is currently in the state of being held in a hand.

The handheld object 106 is depicted as a controller, for example, for a video game system. The handheld object 106 may, in some examples, include an onboard processor, storage system, and communication system. In other examples, the handheld object may not include one or more such systems, but may include lights to assist in optical tracking of the handheld object. The handheld object 106 may also include one or more input controls, such as a button, trigger, joystick, directional pad, touch screen, etc. The handheld object 106 comprises an inertial measurement unit (IMU) (which may include an accelerometer, gyroscope, magnetometer, and/or other suitable sensors) that provides output related to changes in position and orientation of the handheld object 106. In some examples, the HMD 102 may also include an IMU to help track changes in the HMD pose in the environment.

Figure 3:
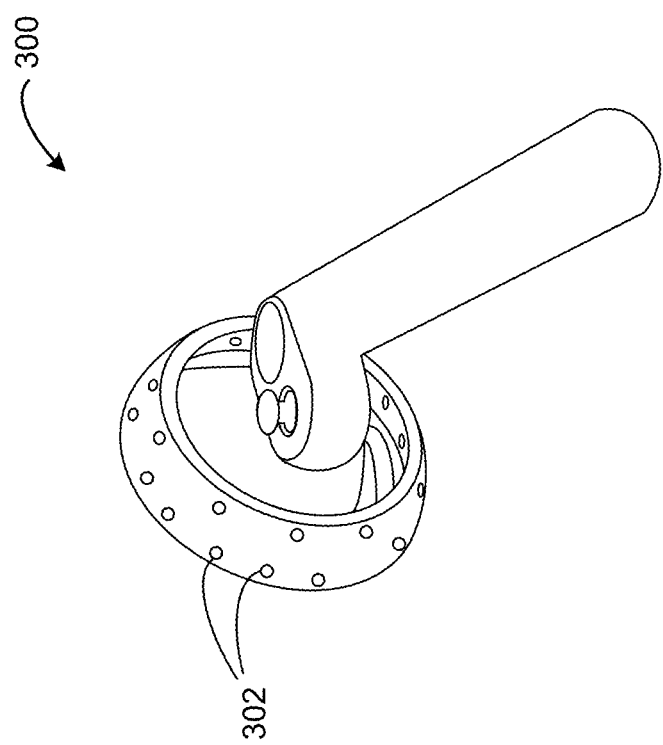
FIG. 3 shows a view of an example handheld object.

The handheld object also includes a plurality of light sources distributed over a surface of the handheld object. FIG. 3 shows an example handheld object 300 having a plurality of light sources 302 distributed along both an exterior and interior of a ring-like structure of the handheld controller 300. The light sources are configured to form patterns of light ("constellations") in image data acquired by the camera or cameras of the HMD, such that a pose of the handheld object may be determined from an image capturing the controller. The light sources may take any suitable form, such as light-emitting diodes (LEDs) that emit visible light for detection via a visible light camera or cameras on the HMD. Infrared light sources also may be used. In some examples, the camera(s) on the HMD may be configured to filter wavelengths of light other than those emitted by the LEDs to reduce noise levels in the image data. A handheld object may have any suitable number and arrangement of light sources.

Figure 4:
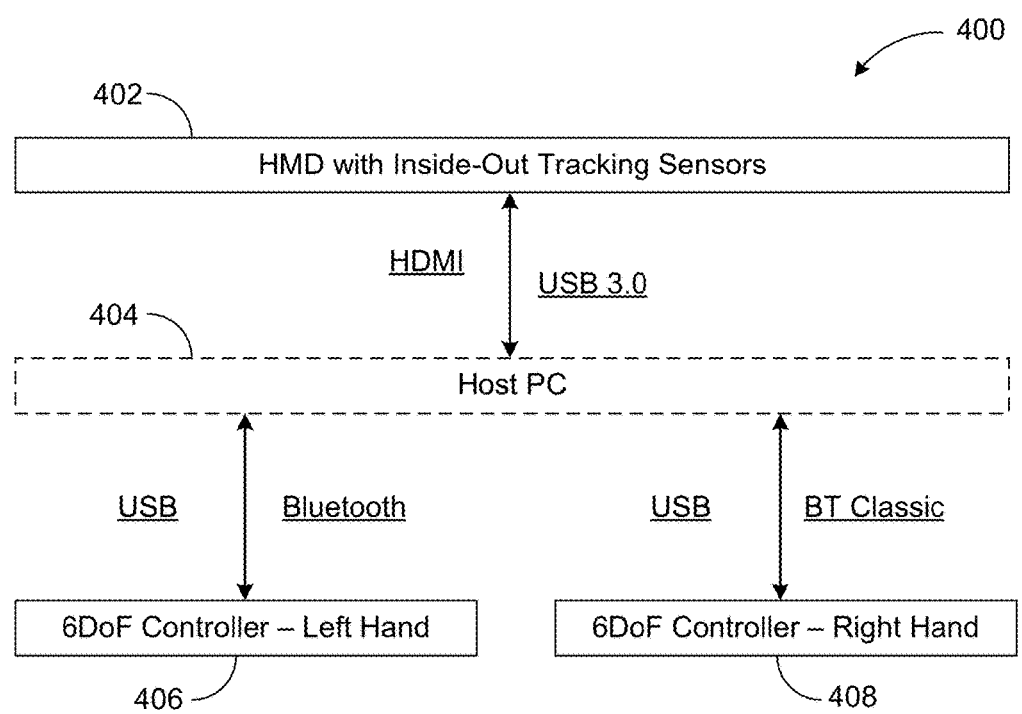
FIG. 4 shows an example computing system architecture for tracking a handheld object via a wearable device.

In some examples, the HMD 102 and handheld object 106 are configured to communicate with one another directly, such as via a wireless network connecting utilizing a Bluetooth communication protocol or other suitable wireless communication protocol. In other examples, an optional host computing device 110 may communicate with the HMD 102 and the handheld object 106 to receive data from HMD 102 and handheld object 106 (including image data acquired by the HMD 102 and IMU data from the handheld object 106), to process such data, and to send control signals to these devices. FIG. 4 shows an example computing system architecture 400 including an HMD 402 with tracking sensors, a host PC 404, a left handheld controller 406 and a right handheld controller 408, wherein each controller provides six degrees of freedom. Each of the left handheld controller 406 and the right handheld controller 408 is depicted as communicating with the host PC 404 via USB (Universal Serial Bus) and Bluetooth. In this example, different protocols may be used for different contexts. For example, the USB connection may be used for factory calibration while the Bluetooth may be used during ordinary device use. Similarly, the host PC 404 may communicate with the HMD 402 and/or the handheld controllers 406, 408 via any suitable wireless or wired communication protocol. Examples are illustrated as HDMI (High Definition Multimedia Interface) and USB. As mentioned, host PC 404 is optional, and each of the handheld controllers 406 and 408 may communicate directly with the HMD 402 in some examples. It will be understood that while disclosed herein in the context of handheld controllers, any suitable handheld or movable object may be tracked, including objects without any internal computing system or IMU, where such objects include a plurality of light sources detectable as a constellation in image data. Likewise, the specific communication channels shown in FIG. 4 are presented for the purpose of example, and any other suitable communications channels, wired and/or wireless, may be used for HMD-to-host communication, host-to-handheld controller communication, and/or HMD-to-controller communication.

A relative-to-HMD pose (position and orientation) of the handheld object 106 may be estimated by tracking the positions of light from the light sources on the handheld object 106 using the one or more cameras on the HMD 102. Data from the IMU on the handheld object 106 can further inform tracking, such as when the light sources might be occluded from view. However, the image data provides a pose of the handheld object 106 relative to the HMD 102, while the IMU senses the forces proportional to the change in position and orientation in its body frame relative to the inertial frame.

Figure 5:
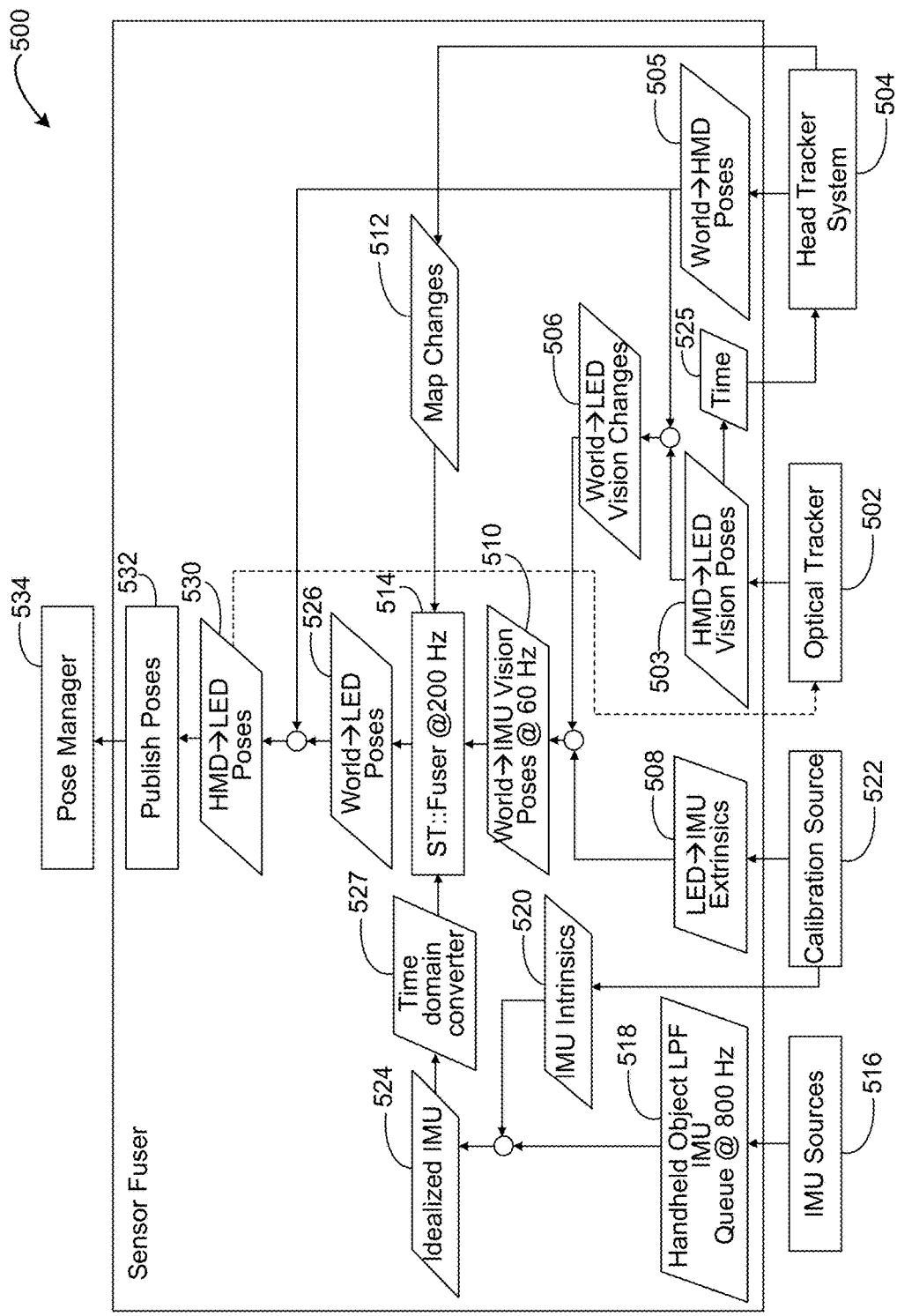
FIG. 5 shows an example processing system operable to derive the pose of a handheld object and HMD with respect to real world coordinates.

Thus, to combine the optical pose from image data with the IMU data to provide the actual pose of the handheld object 106 relative to the world, processing may be used to "fuse" the IMU data with the optical data by mapping the optical data to world coordinates. FIG. 5 shows a block diagram of an example processing system 500 that may be used to derive the pose of the handheld object and HMD with respect to real world coordinates from IMU data from the handheld object, and image and/or IMU data from the HMD. The processing system 500 may be implemented via any suitable hardware, including but not limited to the HMD, the handheld object, a host computing device in communication with the HMD and/or the handheld object, or distributed among multiple of these devices and/or other devices.

In the depicted system 500, the HMD receives image data capturing the surrounding environment and the handheld object(s) in the scene via an image sensor located on the HMD. Image data used to track the surrounding environment is referred to herein as "environmental tracking exposures" and image data used to track handheld object(s) is referred to herein as "handheld object tracking exposures." Various example methods of acquiring these exposures are described in more detail below.

An optical tracker 502 of the HMD analyzes the image data and outputs data regarding the pose of the handheld object (or each handheld object, where multiple handheld objects are detected) with respect to the HMD ("HMD→LED Vision Poses" 503) by visually tracking the position and orientation of the handheld object per frame using the handheld object tracking exposures. Light sources may be identified in the image data, for example, by thresholding the image to find rough light source locations, and then fitting a statistical curve (e.g. a Gaussian function) to the thresholded images to locate the light source on a pixel or sub-pixel basis. Once the light sources in the image data are located, any suitable method may be used to determine the position and orientation of the handheld object, including but not limited to epipolar line fitting and rigid body transformation fitting based on the determined light source locations.

A head tracker system 504 provides a pose of the HMD relative to the world ("World→HMD Poses" at 505) by visually tracking the HMD relative to the background environment using the environmental tracking exposures. Any suitable method may be used to perform the environmental feature tracking. For example, environmental features may be tracked by performing image recognition on the environmental tracking exposures, e.g. to identify features such as edges in the image and then tracking changes in location of the features between environmental exposure frames.

The optical pose of the handheld object with respect to the HMD ("HMD→LED Vision Poses" at 503) and the optical pose of the HMD relative to the world ("World→HMD Poses" at 505) are used to determine a pose of the handheld object with respect to the world. The pose thus determined is also referred to as a "visual pose" herein. This pose may be provided in the form of data representing changes in pose compared to a previous determination, as indicated at 506 ("World→LED Vision Changes"), or in any other suitable form. This data is adjusted via extrinsic calibration data (illustrated as "LED→IMU Extrinsics" at 508) regarding the light sources and IMU of the handheld object to produce "World→IMU Vision Poses" at 510.

Optical pose data regarding the pose of the handheld object ("HMD→LED Vision Poses" at 503) and the pose of the HMD ("World→HMD Poses" at 505), both visually observed from the perspective of the HMD, are further provided to a fuser 514. The fuser 514 takes the optical pose data and "fuses" it with IMU data received the handheld object to provide an actual pose of the handheld object with respect to the environment.

IMU data is received from IMU sources 516 on the handheld object. The IMU data may represent six degrees of freedom. Because accelerometers and gyroscopes may have random errors which have a flat frequency response that spans the whole bandwidth, a low pass filter (LPF) at 518 may be used to reduce such noise by removing the high frequency components that may not be used for the operation. Filtering may be performed remotely (e.g. via a host PC) or locally, and the data also may be downsampled. The resulting IMU data then may be adjusted via intrinsic calibration data 520 (illustrated as calibration source 522) previously stored for the handheld object. Example intrinsic calibration data 520 includes data regarding stereo camera offset and relative camera positions. Such calibration data may be updated during system use, as described in more detail below. The resulting "Idealized IMU" data 524 is provided to the fuser 514 for fusing with the image data from the head tracker system and the optical tracker.

The handheld object and the HMD operate in separate clock domains, and communications channels between them may experience lag and potentially inconsistent data rates. As such, to help relate the IMU data to a temporally corresponding visual tracking pose 510, a time domain converter 527 is used to align the time domains of the handheld object with that of the HMD. Examples of methods for performing this alignment are described in more detail below.

Time information 525 regarding when optical poses were measured is provided to the head tracker system 504. The head tracker system 504 may give a most probable World→HMD pose at the time of when a corresponding HMD→LED vision pose is obtained so that the discrete time moments regarding when HMD→LED Vision Poses 503 and World→HMD Poses 505 are evaluated are sufficiently coincident.

As the visual pose data for the handheld object that is input to the fuser is relative to the external environment, and as the IMU data from the handheld object is in its body frame relative to the inertial frame, the fuser 514 may fuse these data and output the handheld object pose with respect to the world, shown as "World→LED Poses" at 526. The fuser 514 may fuse these data in any suitable manner, such as via the use of a filter. In some examples, multiple Kalman filters may be used, each operating on discrete data at discrete time stamps, to help accommodate uncertainties with regard to correspondence in timing of the IMU data and the visual pose data.

A "Map Changes" process 512 may be utilized to track changes in head pose with respect to different tracking features within the world, and adjust mapping when the tracking features change (e.g. when a user moves between rooms). "Map Changes" may be performed by rebasing world coordinates on a new world coordinate system, or by mapping the new world coordinates back to the original world coordinate system. Such updates to the map may ensure that ongoing changes in the location of the HMD relative to the world are continually taken into account by the fuser 514.

The "World→HMD Poses" 526 output by the fuser may be used to derive a relation of the HMD to the handheld object, shown as "HMD→LED Poses" 530. "HMD→LED Poses" data 530 then may be resulting from the fuser 514 may also be sent as feedback to the optical tracker 502 for motion prediction purposes to help predict an expected pose of the controller in a next frame based upon HMD motion and the handheld object pose. Pose data further may be published at 532 and sent to a pose manager 534.

Figure 6:
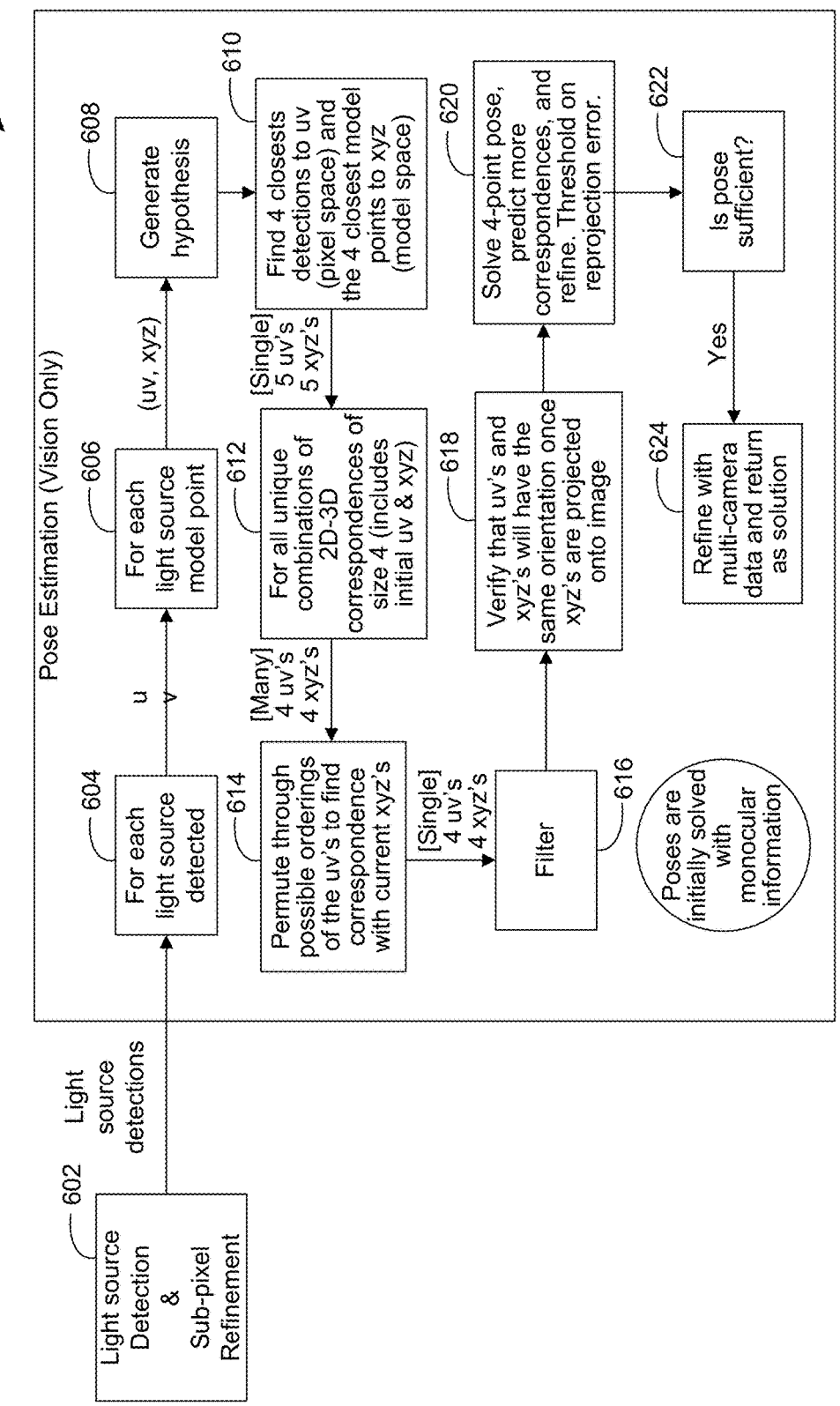
FIG. 6 shows a flow diagram illustrating an example method of estimating a pose of a handheld object.

FIG. 6 shows a flow diagram illustrating an example method 600 of estimating a pose of a handheld object. Method 600 may be performed, for example, by the optical tracker of an HMD, such as optical tracker 502 of FIG. 5, and may be performed separately for each camera of a stereo camera pair. Method 600 initially includes performing, at 602, light source detection and sub-pixel refinement. As mentioned above, light sources on the handheld object may be detected in handheld object tracking exposures of image data obtained from a camera. In each handheld object tracking exposure, multiple light sources may be detected. Each light source spot may cover multiple pixels. The relatively large size of the light spot may introduce uncertainty into the pose estimation. As such, a sub-pixel refinement may be performed to determine a most likely sub-pixel location for each light source in the image.

At 604, for each light source detected, a pixel location in the image for that light source is determined, represented by pixel coordinates u, v. Next, at 606, each two-dimensional u, v pixel may be mapped to a corresponding candidate three-dimensional data point x, y, z based on a three-dimensional coordinate frame system in space. At 608, the computing device may generate a hypothesis for the pose of the handheld object based on these light source correspondences. At 610, the computing device may determine four of the closest detections to the u, v pixel coordinates in pixel space and four of the closest model points to x, y, z in 3D model space. For unique combinations of 2D-3D correspondences of size 4 (referring to the four closest detections and model points), which includes the initial u, v and x, y, z coordinates (at 612), the computing device may permute through all possible orderings of the u, v's to fine correspondence with x, y, z's, at 614. These possible orderings are then filtered, at 616, and further verified that u, v's and x, y, z's will have the same orientation once the x, y, z's are projected onto the image, at 618. At 620, the computing device solves for a 4-point pose, which refers to the pose (translation and rotation) obtained by evaluating a correspondence of size 4. The computing device further predicts more possible uv-xyz correspondences, and refines these predictions. The predictions are thresholded on a reprojection error, the error between 2D detection points (u, v's) and the prediction of associated 3D points (x, y, z), assuming a certain pose. At 622, the solution is evaluated to determine a likelihood of that solved pose as sufficiently matching the observed data. If the pose is determined to be sufficient, the computing device further refines the pose with multi-camera image data and returns the final pose as the solution, at 624. For example, because the HMD may have more than one camera, a pose may be solved for each camera on the HMD. Such refinement is performed as postprocessing of a multitude of poses obtained from different cameras. In other examples, any other suitable pose estimation process may be used.

Figure 7:
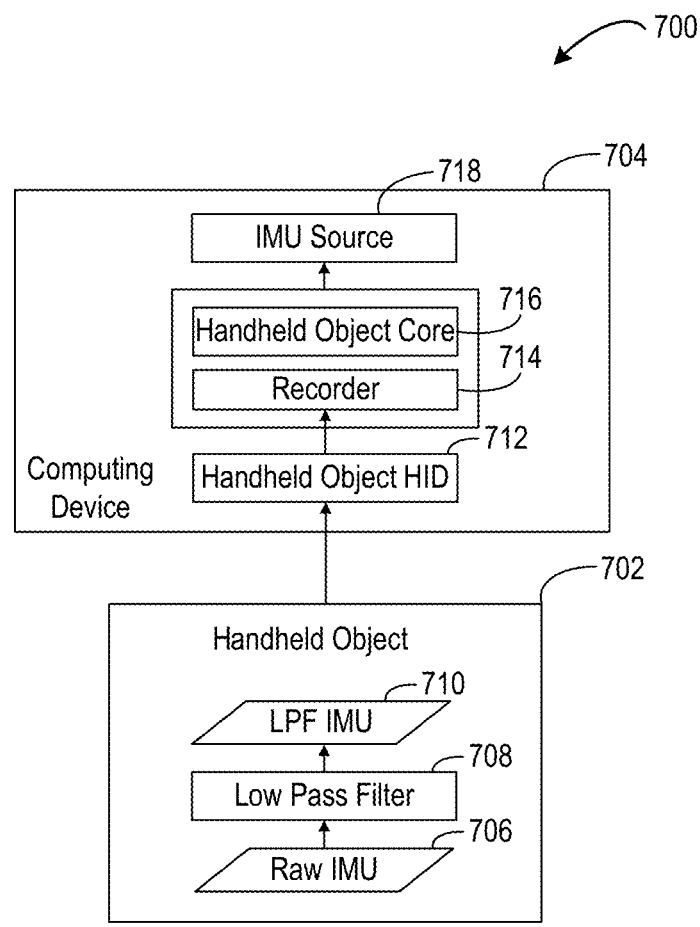
FIG. 7 illustrates an example of processing of IMU data on a handheld object and on a host computing device.

FIG. 7 shows a flow diagram illustrating example processing of IMU data on the handheld object 702 and on another computing device 704 to which the IMU data is sent, such as a host PC or HMD. IMU source 718 is an example of IMU sources 516 of FIG. 5. Raw IMU data 706 from the handheld object 702 is filtered using a low pass filter 708, as described above, and downsampled for sending to the other computing device 704. The low-pass-filtered IMU data 710 is received at a handheld object human interface device (HID) 712 of the host computing device 704 and is further processed by a recorder 714 and handheld object core 716 to produce the data provided as IMU source 718.

As described above, the handheld object may use visible light LEDs to provide pose estimation using one or more visible light cameras on the HMD. In one example, a handheld object may have an arrangement of thirty-two visible light LEDs that may be actively illuminated for device tracking. Further, in some examples, two handheld objects may be utilized. In such examples, the light source arrangements for the two handheld objects may be the same, or may be different and non-symmetric to facilitate distinguishing the light patterns arising from each controller when both are visible in an image frame. The use of visible light sources and visible light cameras may help to avoid interference with foreign devices that may use infrared light, for example. Further, the use of visible light LEDs may allow the same visible light sensors used to image the surrounding environment for tracking the HMD pose to be leveraged for tracking the LED constellations.

As mentioned above, image data from the HMD may be used to track both a pose of the handheld object relative to the HMD and a pose of the HMD relative to the surrounding environment. However, different image data characteristics may be advantageous for these functions. For example, HMD pose is estimated using inside-out visible light camera sensors of the HMD (e.g. arranged as a stereo camera system) that track features detected in images of the environment, which may image the environment via ambient light. Thus, to acquire sufficiently detailed images for HMD pose tracking, it may be helpful to use relatively higher camera gain and longer exposure settings (on the order of milliseconds in some examples) to obtain images from which sufficient environmental features may be extracted.

On the other hand, the handheld object pose is determined by tracking light output by the plurality of light sources on the handheld object. As the light sources may have a relatively high intensity compared to ambient light used for the HMD tracking images, a shorter camera exposure (on the order of tens to hundreds of microseconds in some examples) may be used to detect the light sources against the background environment. In such images, the light sources may be detected as bright spots against a mostly black background in the shorter exposure image.

In view of these factors, acquiring head pose and handheld object pose estimation data using the same optical settings (e.g. integration time, gain) may result in either capturing sufficient background features of the environment but not enough contrast in the light source region, or capturing the light source region with acceptable contrast but with insufficient detail in the background region of the images. One possible solution may be to use different, dedicated cameras (or different arrangements of plural cameras) on the HMD for each tracking function, wherein one camera or arrangement of cameras takes shorter exposure, lower gain images for light source tracking, while the other camera or arrangement of cameras takes longer exposure, higher gain images for environment tracking. However, the use of such dedicated camera arrangements for environment and handheld object imaging may increase system cost, power consumption, and heat output.

Thus, in some examples, a same image sensing system (e.g. a camera or stereo camera arrangement) may be used for both tracking functions by separating data from the image sensing system into separate virtual camera streams. For example, the image sensing system may be configured to interleave long exposure frames for environment tracking and short exposure frames for handheld object tracking to form exposure sequences, wherein an exposure sequence is a repeating pattern of environmental tracking exposures and handheld object tracking exposures. In some examples, the image sensing system also may be used to acquire a greater number of frames for handheld object tracking than for head tracking in an exposure sequence. For example, because the handheld object may change pose at a faster rate than the HMD, acquiring a greater number of frames for handheld object tracking than for head tracking may help to maintain tracking fidelity between image observations.

In some examples, acquiring the environmental tracking exposures comprises utilizing one or more of a longer exposure time and a higher gain for the handheld object tracking exposures. In one more specific example, a 120 Hz frame frequency camera may be used as a shared camera sensor in the HMD. In such a system, one example exposure sequence may comprise a 1:1 ratio of long and short exposure times in which one 60 Hz long (background) exposure is followed by a 60 Hz short (handheld object light source) exposure. Another example exposure sequence comprises a 1:2 ratio of a 30 Hz long exposure followed by two 60 Hz short exposures. As yet other example sequences, a 1:3 ratio of one long exposure followed by three short exposures may be used, or a 2:3 ratio (e.g. one long exposure, followed by one short exposure, followed by one long exposure, followed by two short exposures) may be used. In yet other examples, any other suitable exposure sequences may be used.

Figure 8:
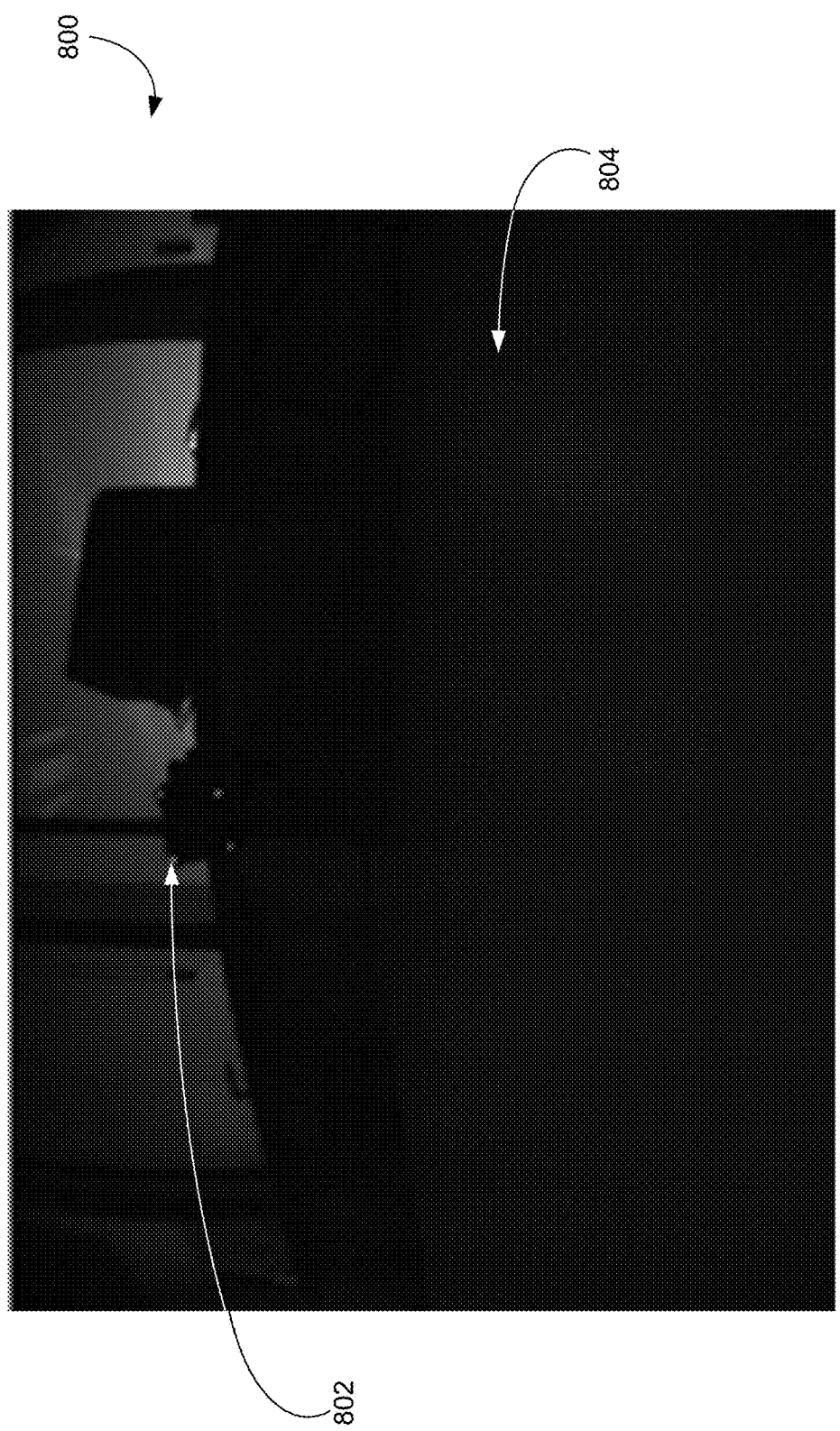
FIG. 8 shows an example handheld object tracking exposure.

FIG. 8 shows an example image 800 generated by the shared camera sensor during a short exposure for handheld object tracking, wherein a constellation of light sources of the handheld object is detected as illuminated spots 802 against a darkened background 804. Any suitable method of feature detection may be used to detect the constellation of light sources of the handheld object. As one example, the image 800 is first thresholded to locate bright spots which may arise from a plurality of light sources of the handheld object. A distribution then may be fit (a Gaussian or other suitable distribution function) to locate a pixel center of each candidate bright spot. Such fitting also may be used to reject candidate bright spots that do not match a profile expected for the plurality of light sources of the handheld object. Based upon a location of each light source detected in the image 800, a pose of the handheld object may be identified, as described in more detail below.

In some examples, the light sources associated with the handheld object may be powered continuously when acquiring both environmental and handheld object tracking exposures. However, in such examples, the light emitted by the plurality of light sources of the handheld object may interfere with the camera frames corresponding to tracking a pose of the HMD (e.g., environmental tracking exposures), and also may result in high power consumption.

Thus, in other examples, the plurality of light sources on the handheld object may be selectively controlled to pulse at a higher integrated intensity during the exposures corresponding to handheld object tracking, and controlled to pulse at a lower integrated intensity during the exposures corresponding to environmental tracking. In some examples, the light sources may be controlled to pulse on during handheld object tracking exposures and to pulse off during environmental tracking exposures. In either example, pulsing the light sources may help to improve quality of the images of the background environment for HMD pose tracking, reduce perceived user brightness of the handheld object light sources, and extend battery life.

However, when light sources of the handheld object are pulsed at lower pulse frequencies, a noticeable flicker may be perceived. As such, where environmental tracking exposures and/or handheld object tracking exposures are acquired at a frame rate(s) at which flicker may be noticeable, various strategies for reducing the perceptibility of such pulse modulation may be employed. Such strategies may be determined based on such factors as light pulse frequency, light intensity, and quality of the environment and handheld object images acquired by the imaging sensing system. For example, regarding frequency, light source pulsing may be perceptible by the human eye when the pulse frequency is lower than the refresh speed of the eye. Thus, using a light pulse frequency of 90 Hz or higher, for example, may help to reduce perceptibility of the light source modulation.

Figure 9:
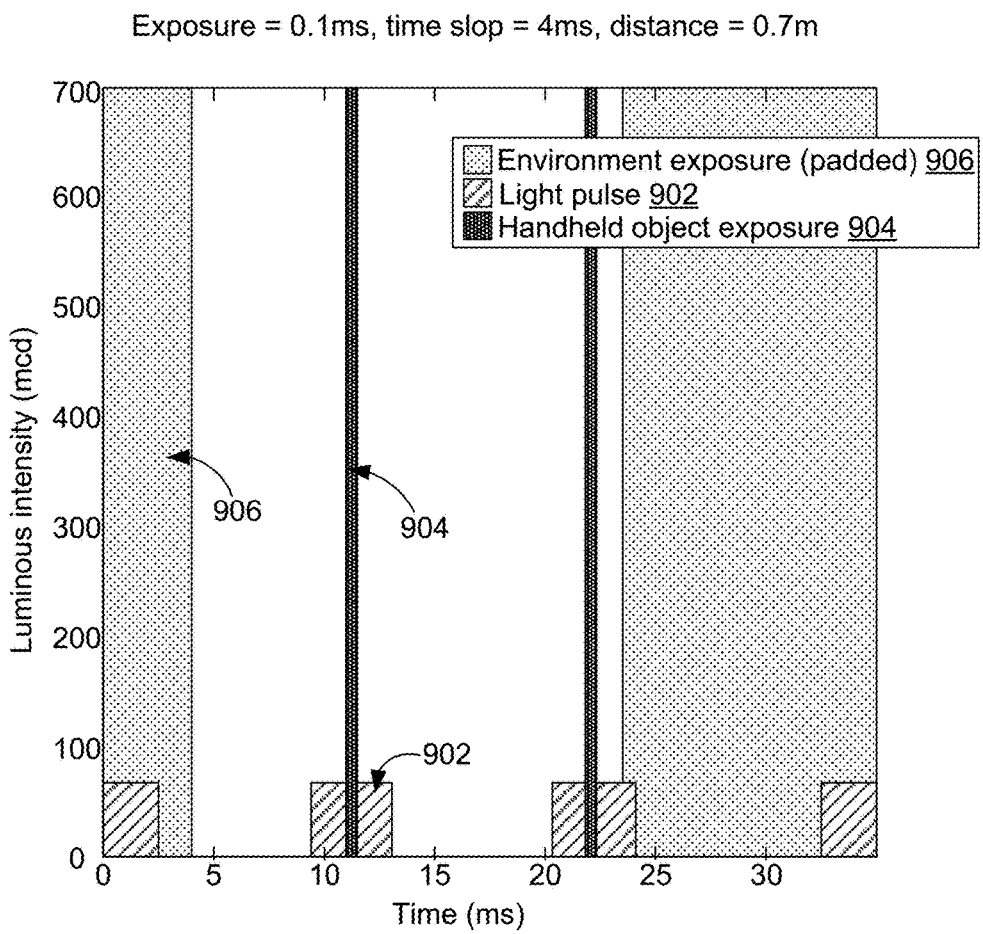
FIG. 9 shows an example light pulse mitigation strategy.

FIG. 9 shows a plot illustrating light pulses 902 and image acquisition exposures 904, 906 as a function of time in one example pulse mitigation strategy. In this example, the plurality of light sources of the handheld object are pulsed for three milliseconds at a uniform 90 Hz frequency. The handheld object tracking exposures 904, 100-400 microseconds in duration in this example, are aligned with the centers of two sequential light pulses 902, and a longer 33 millisecond environmental tracking exposure 906 is used to acquire a background environment image. Such a pulse may appear to the human eye as light of a uniform intensity due to the sufficiently high modulation rate.

In the example of FIG. 9, some of the environmental tracking exposure acquisition period 906 overlaps with the light source illumination period 902. To avoid such overlap, shorter, brighter pulses of the light sources may be used for the imaging the handheld object in the handheld object tracking frames 904. Shorter, brighter light pulses may make it more difficult to synchronize the handheld object tracking exposures 904 with the light pulses 902 output by the handheld object light sources, due for example to uncertainties in the time taken for control instructions to travel between a controlling device (whether a host computer or an HMD) and the handheld object.

Figure 10:
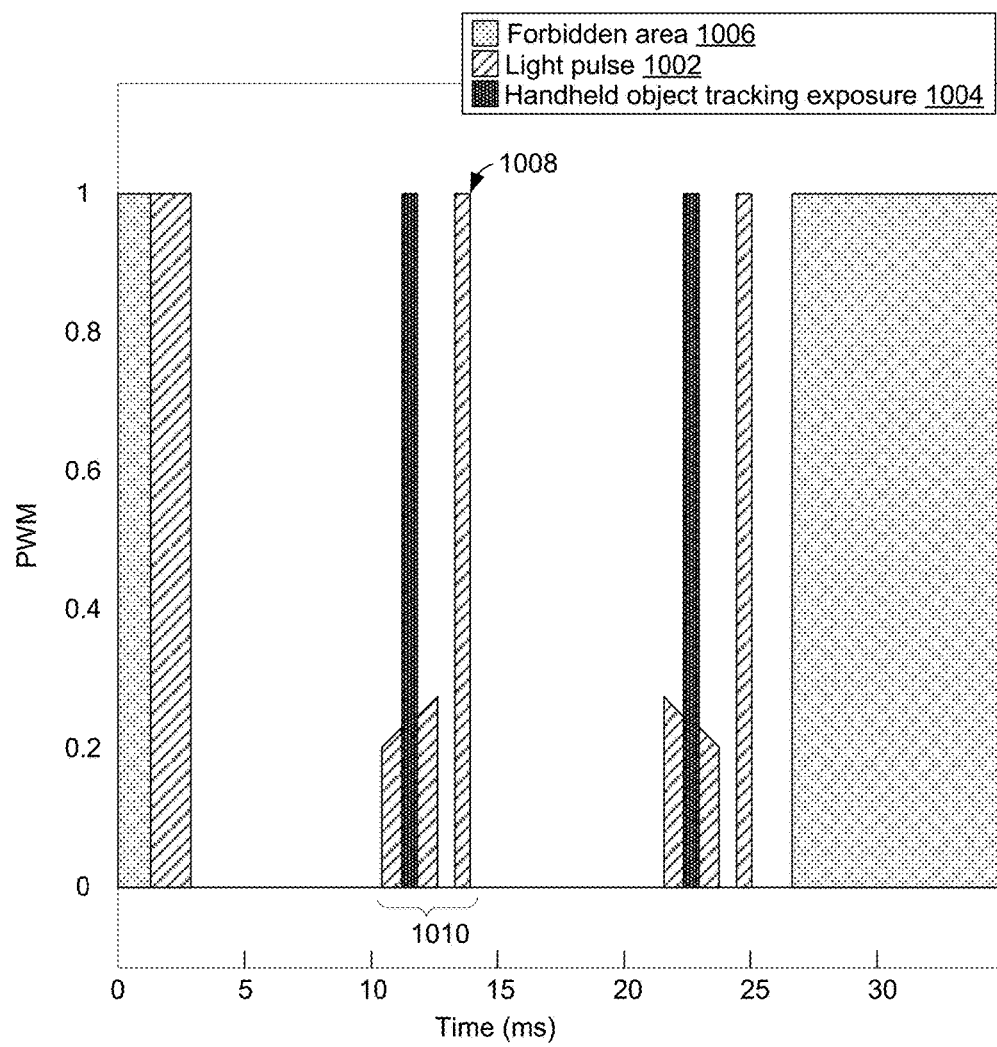
FIG. 10 shows another example light pulse mitigation strategy.

Thus, to allow light pulses of sufficient width for more certain camera/light pulse synchronization while avoiding illumination of the light sources during an environmental tracking exposure, a light pulse sequence may utilize light pulses arranged in various patterns configured to have sufficiently similar overall integral intensities to maintain a uniform perceived brightness. FIG. 10 shows a plot illustrating light pulses 1002 and image acquisition frames 1004, 1006 as a function of time for another example strategy to reduce perceptibility of light pulses modulation. In this example, a combination of flat and ramped light pulses 1002 is used. As described in more detail below, the use of ramped light pulses may facilitate clock synchronization between the image sensing system and the handheld object.

In some examples, the handheld object may emit one or more light pulse clusters, wherein each light pulse cluster comprises an exposure light pulse and an antiflicker light pulse. FIG. 10 shows anti-flicker light pulses 1008 introduced in addition to the light pulses 1002 for the handheld object tracking exposures to form light pulse clusters 1010. Each anti-flicker light pulse 1008 may comprise a duration and intensity that results in a "center of mass" of a light pulse cluster 1010 containing the anti-flicker light pulse 1008 to be positioned at a desired frequency interval, and to have a total integrated intensity (e.g. area under the curve of all pulses in that cluster) substantially equal to light pulses 1002 or light pulse clusters 1010 located at other frequency intervals. In this example, anti-flicker light pulses 1008 introduced at times 1, 2, 14, and 25 milliseconds form three light pulse clusters 1010 with centers of mass at 1.5, 12.5, 23.5 milliseconds, respectively, such that the centers of mass are approximately 11 milliseconds apart (e.g. light pulses at 90 Hz). The light pulse clusters 1010 in this example are configured such that the integral intensity is equal for each light pulse cluster 1010. In this example, the plurality of light sources pulse at 90 Hz, yet may appear uniformly bright over time to the human eye.

The anti-flicker pulses 1008 may have any suitable duration(s) and intensity or intensities. The use of shorter, brighter anti-flicker pulses 1008 may allow the anti-flicker pulses 1008 to be spaced in time farther from the environmental tracking exposures 1006, and thus provide more room to accommodate uncertainties in the synchronization between the clocks of the HMD and the handheld object than the use of longer, less intense anti-flicker pulses 1008.

Figure 11:
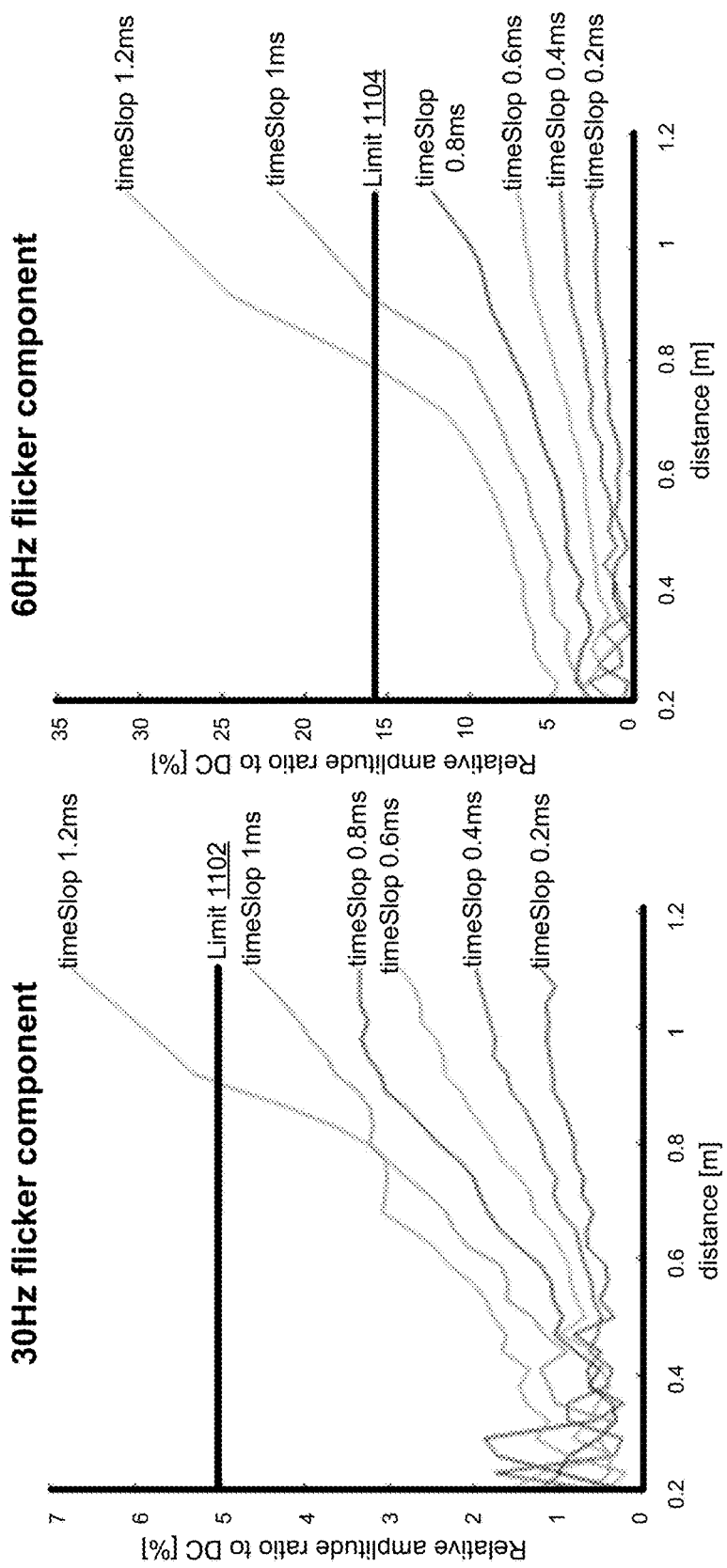
FIG. 11 shows plots of relative flicker amplitude as a function of distance from a flicker source for 30 Hz and 60 Hz flicker components.

In cases where a time synchronization between the HMD and handheld object is less accurate and/or it is desired to utilize longer anti-flicker pulses 1008 for a higher perceived light intensity, the risk of overlap between an anti-flicker pulse 1008 and an environmental exposure 1006 may increase. To avoid such overlap, the timing of an anti-flicker pulse 1008 may be shifted. Such time shifting of the anti-flicker pulse 1008 may degrade the anti-flicker quality to a degree, but may still be within acceptable limits to prevent perception of flicker. FIG. 11 shows plots of relative flicker amplitude as a function of distance from a flicker source (e.g. the handheld object), wherein the quality of anti-flickering decreases as the distance between the HMD and the handheld object increases for both 30 Hz and 60 Hz flicker components. In this example, increased distance between the HMD and the handheld object increases a time synchronization uncertainty, and light pulses surrounding the handheld object tracking exposure may become longer in length to compensate. Wider light pulses surrounding the handheld object tracking exposure may thus decrease room to incorporate anti-flickering light pulses. In FIG. 11, a limit 1102 is imposed to indicate an example range wherein light pulse modulation remains unperceived for the 30 Hz flicker component, and a limit 1104 is imposed to indicate an example range wherein light pulse modulation remains unperceived for the 60 Hz flicker component.

To determine a pose of the HMD, individual light sources on the handheld object are identified in the image data. The HMD pose relative to the handheld object pose then may be determined using a rigid body transform of the HMD about the handheld object or other suitable methods. To disambiguate light sources from each other in a constellation on a single handheld object, in some examples a Perspective-n-Point (PnP) method may be used in which an acquired image may be associated with points in a reference three-dimensional (3D) model to transform into corresponding two-dimensional (2D) points in the image. The PnP method may be used, for example, in combination with a RANSAC method, exhaustive search method, and/or other suitable method to hypothesize associations between the image observations and the points in the 3D model. A cost function may evaluate these hypotheses and determine which associations are the most accurate, eventually obtaining data associations and the most likely pose of the handheld object based on the data associations. In some examples, pose prediction from previous pose estimates may also be used to assist with data associations. Gravitational information derived from IMUS of the HMD and handheld object may also be used to help reduce the complexity of the data association.

In some examples, light emitted by the light sources on the handheld object may be modulated to help further inform a search algorithm. As examples, the handheld object may be controlled to turn one or more of its light sources off, to turn one or more light sources on at specified time intervals, to adjust the intensity of one or more of its light sources to a lower intensity and the remaining light sources to a higher intensity, and/or to perform any other suitable modulation(s) that may assist with disambiguation.

In scenarios where both left hand and right hand handheld objects are used, the left hand light source constellation may be distinguished from the right hand light source constellation. Likewise, where handheld objects of an adjacent user are simultaneously viewable with the handheld object of a user, constellations arising from the handheld object of the adjacent user may be distinguished from the handheld object of the user.

In scenarios involving two or more handheld objects, each handheld object may be distinguished, for example, by defining bounding boxes around or separately clustering light source constellations from each handheld object at times where the multiple handheld objects are far enough apart to distinguish clusters, e.g. at least a threshold distance apart. For example, this threshold distance may be a predetermined via a clustering algorithm in which light sources within a threshold distance of one another may be determined to be located on a same handheld controller. At times where constellations arising from multiple handheld objects would be difficult to separate by clustering, then each handheld object may be distinguished, for example, by emitting a unique pattern and/or sub-patterns of light sources to provide exact pose estimates with unambiguous data associations. For example, left and right handheld objects may be configured to emit constellation patterns that are non-symmetrical, and their unique patterns may be used to discriminate left from right. As such, suitable search algorithms may be used to efficiently search the space of unique patterns and generate highly likely poses. Likely poses may be refined, for example, using nonlinear optimization techniques, to create accurate pose estimates.

As examples of methods of controlling pattern emission for disambiguation, one handheld object may be controlled or configured to emit higher intensity light than the other handheld object, one handheld object may be controlled or configured to turn off its light sources in certain frames, and/or the left and right handheld objects may be controlled or configured to emit light at different frame rates. Further, motion prediction may be used to help determine when such light source modulation may be useful (e.g. when handheld objects are close or approaching one another), and when clustering may be used instead (when handheld objects are suitably far apart and/or not approaching one another).

Further, in some examples, light source brightness may be used as a depth cue to help disambiguate light sources across multiple handheld objects. For example, as described in more detail below, the intensities of light sources on a handheld object may be varied based upon a distance of a handheld object to the HMD. As such, if a first subset of light sources is detected as being brighter than a second subset of light sources, this may indicate that the first subset is associated with a first handheld object a greater distance from the camera, and the second subset is associated with a second handheld object that is closer.

Any other suitable information from the light constellation patterns may be utilized to help with disambiguation and pose identification. For example, light source brightness may be modeled as a function of duty cycle, angle time, temperature, and/or position in the image, and may then be used to reject certain poses (e.g. these light sources cannot be this bright and be in this pose) or to identify likely poses. Light source brightness also may be utilized as part of an error term in a generative model, e.g. as described above with respect to the PnP method.

In yet other examples, absolute orientation information or orientation relative to the gravity vector provided by the IMU onboard the handheld object may be used to prune candidate light source correspondences resulting from the PnP method. For example, light sources from foreign devices may happen to have a same constellation, but may be filtered out when the device orientation as indicated by the IMU does not match, or is otherwise too far, from the previous estimated pose. In some examples, it may also be possible to determine that a light source constellation is from a foreign device if those light sources cannot be controlled by the host computing device or HMD.

Further, once certain light source constellations are recognized as being from foreign devices, the system may then offset a time phase of the HMD camera exposures in order to avoid detecting light source constellations of the foreign devices. Light sources may be pulsed to align with the camera exposures and be offset in time such that the pulses interleave with pulses from foreign devices.

Further, in some examples, a trained machine learning model may be used to disambiguate light source constellations. For example, such a model may be used to disambiguate light sources from left and right handheld objects when the handheld objects are in close proximity, and/or to directly predict a handheld object pose.

As mentioned above, in some examples, an intensity of each light source may be dynamically adjusted based on the pose of the handheld object relative to the HMD. For example, the farther a distance the handheld object is from the HMD, the brighter the light sources may need to be to maintain signal quality, as a light source captured in an image drops quadratically with increase in distance. On the other hand, shorter distances may cause the light source to saturate the pixel intensity if the light sources are too bright. Further, light source intensity in the image also drops with an increased angle of illumination, e.g. due to rotation of the handheld object relative to the HMD, as each light source emits light within a cone of illumination. Additionally, lens vignetting may cause a reduction in image brightness at the periphery compared to the image center.

Accordingly, the intensities of light sources on a handheld device may be dynamically adjusted based upon movement of the handheld device relative to the cameras on the HMD to help maintain suitably uniform image response. In one example, a method of determining how to adjust the intensity of each light source may include a first, priming stage, in which a brightness sweep is performed from a lowest intensity to a highest intensity until the constellation pose and light source correspondences can be successfully estimated in one or more frames. Next, in a second, tracking stage, once the light source correspondences are determined in a frame, if a pixel intensity corresponding to a light source is over a saturation threshold (for example, a digital number (DN) of the image being greater than 200), then the light source brightness may be reduced for the corresponding light source by a selected amount, such as a set fraction amount. In contrast, if pixel intensity is determined to be below a brightness threshold (for example, less than 55 DN) and is thus too dim, the light source brightness may be increased for corresponding light sources by a set fraction amount. Light source brightness may be controlled by applying less or more current to each light source.

The image brightness response may be modeled as a function of such factors as light source duty cycle, angle, time/temperature, and position in the image. Further, motion prediction data, e.g. as obtained from the fuser during processing, may be used to estimate a predicted pose of the handheld object in a future frame, and to control light source brightness for each light source accordingly based upon a magnitude and/or direction of the predicted motion. For example, intensity may be decreased or increased more slowly if the predicted motion of the HMD is relatively slow, while the intensity may be decreased or increased more quickly if the predicted motion of the HMD is relatively fast.

Dynamic adjustment of light source brightness may further be utilized for power saving. As mentioned above, light sources may be positioned at locations around the handheld object. This may help to ensure that a plurality of light sources are visible to the HMD camera or cameras at any time. However, since some light sources may not be visible in certain frames and thus not used for tracking, these light sources may be dynamically dimmed and/or turned off during those frames to conserve power. Information regarding the pose of the handheld object and the pose of the HMD, for example, may be used to determine which light sources may and may not be visible in any image frame.

In some instances, quickly changing the brightness of each light source, including turning the light sources on and off, may be undesirable, as it may be distracting to a user (in an augmented reality scenario), and also others in the vicinity. Thus, in some examples, the light sources may be gradually dimmed to reduce jarring effects. Further, the brightness of a light source further may be controlled based on how close a light source is to becoming visible or invisible to the camera, e.g. based on motion prediction. This may help to prevent sudden, large magnitude changes in intensity. In some examples, IMU data may also be used to inform motion prediction.

Figure 12:
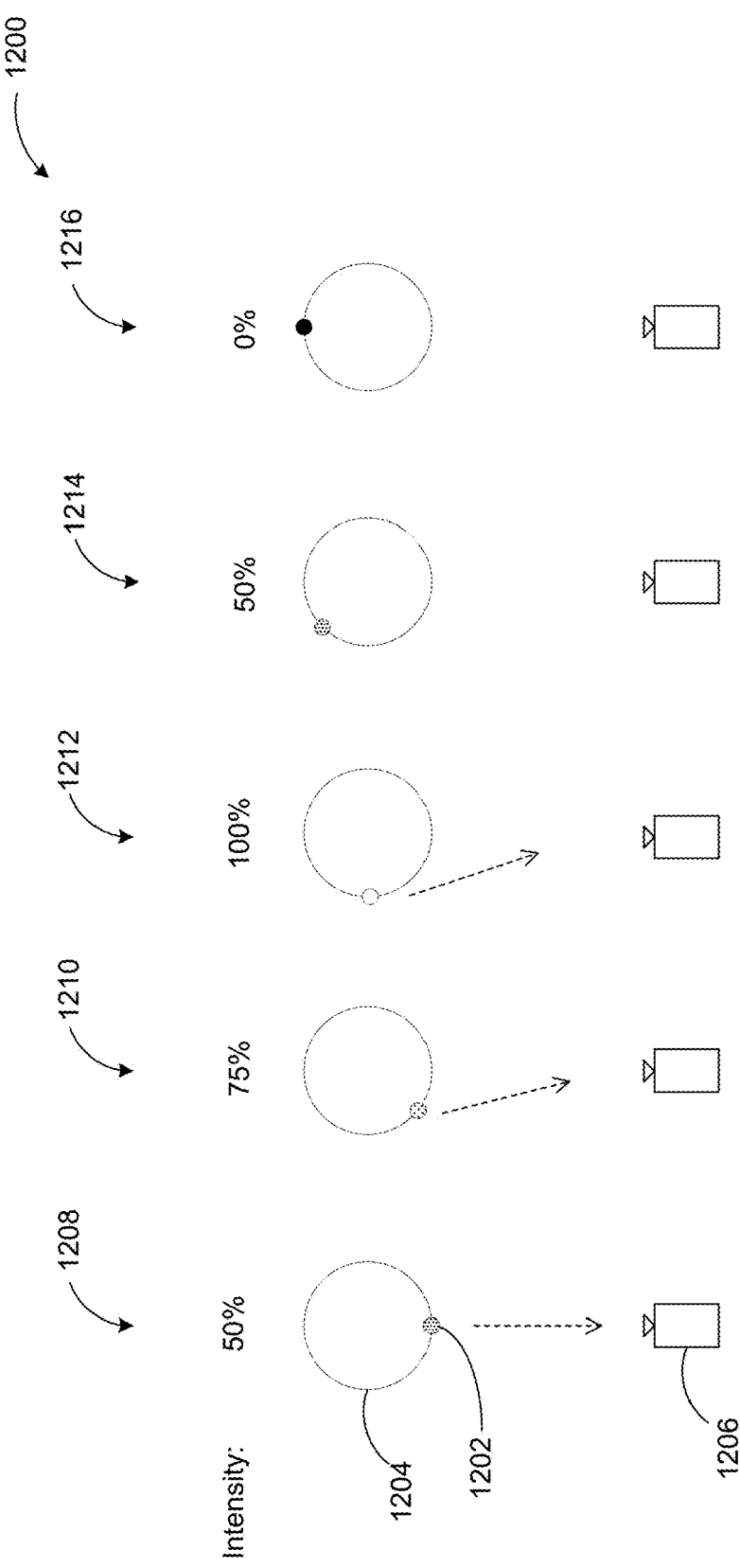
FIG. 12 schematically shows an example method of adjusting light source brightness based upon visibility of a light source on a handheld object as a function of orientation with respect to a camera.

FIG. 12 schematically shows an example method 1200 of adjusting light source brightness based upon visibility of a light source 1202 on a handheld object 1204 while it changes orientation with respect to a camera 1206. In this example, it will be understood that only one light source is shown and the handheld object is represented by a circle for simplicity, but that a plurality of light sources will ordinarily be present. At 1208, the light source 1202 may be directly facing the camera 1206. In this orientation, a highest intensity of light is directed toward the camera, and as such, the light source may be set to a relatively lower intensity (which may be a function of distance from the camera), such as 50% (in the middle of the dynamic range of the light source). At 1210, the handheld object is rotated such that the light source 1202 is farther away and/or at a greater angle from the camera 1206. As the line of sight between the light source and the camera now is at a lower intensity region of the angular intensity distribution of the light source, the intensity may be increased to 75%. At 1212, the light source 902 has rotated to a position that is still visible to the camera 1206, but almost out of sight. Thus, light at this angle is emitted at an even lower intensity. Thus, the output may be increased to 100% of the dynamic range. At 1214, the light source 1202 has begun to rotate out of sight, and such, the brightness is decreased, e.g. back to 50% intensity. As the handheld object 1204 rotates farther and the light source 1202 becomes completely out of view, e.g. at 180 degrees opposite of the camera 1206, the light source 1202 may be completely turned off or dimmed to a suitably low intensity.

FIG. 13 shows a flowchart illustrating an example method 1300 of adjusting light source brightness on a handheld object. Method 1300 may be performed, for example, by execution of instructions via a logic device on any suitable computing device, such as on an HMD or optional host PC. Method 1300 includes, at 1302, receiving image data from an image sensor (e.g. a stereo camera arrangement on an HMD), and, at 1304, detecting a set of light sources of a plurality of visible light sources on the handheld object. Method 1300 further includes, at 1306, sending a control signal to the handheld device to modulate a brightness of one or more light sources of the plurality of visible light sources. The control signal may be based on any suitable inputs. For example, the control signal may be based light source characteristics detected in image data, such as an apparent brightness of one or more light sources in the image data at 1308, a distance of the handheld object from the HMD at 1310 as determined from stereo image data, an orientation of the handheld object relative to the HMD at 1312, and/or an angular location of the handheld object in the field of view of the image sensor at 1314.

In some examples, pose prediction based on previous pose estimates may be used to help determine when light source modulation may be useful, e.g. for disambiguation between multiple handheld objects. Pose prediction may also be used to help determine how to modulate individual light sources on a single handheld object. Accordingly, the control signal may be based on motion prediction data, at 1316. For example, the logic device may determine whether the next predicted position of a light source is farther or closer from the image sensor of the HMD. If the next predicted position of the light source is farther, the light source may be brightened, or if the next predicted position of the light source is closer, then the light source may be dimmed, as examples.

The control signal may be configured to modulate brightness of the light sources by instructing the handheld object to vary a duty cycle of power applied to each light source, at 1318. As discussed above, the logic device may instruct the handheld object to change the duty cycle at a sufficient rate to hide any flicker from the human eye. In some examples, the logic device may instruct the handheld object to apply the same change in brightness to all light sources, at 1320. In other examples, the logic device may instruct the handheld object to apply different brightnesses to two or more light sources. Different brightnesses may be selected based upon any suitable factors. For example, different brightnesses may be based on differences in locations of the two or more light sources on the handheld device, at 1322, such that the brightness of a light source that is oriented more directly toward the image sensor is lower than a brightness of a light source oriented less directly toward the light source. In yet other examples, a subset of the light sources may be turned off while other light sources may be illuminated, such as when the subset of light sources is oriented out of view of the image sensor, at 1324.

Due to network communication round-trip time uncertainties and other factors, the HMD clock domain and the handheld object clock domain may not be synchronized at times. For example, in some systems, the HMD may assign timestamps to data from the HMD sensors (e.g. IMU and image data), and the handheld object may assign timestamps to data from the handheld object sensors (e.g. IMU data), while in other systems a host computer may apply timestamps to data it receives from both the HMD and the handheld object. In either example, time uncertainty may be introduced by factors including data travel time over Bluetooth, data travel time over USB, delays in data sending at the HMD, delays in data sending at the handheld object, and delays in data recognition at the host PC, as examples. Such time uncertainty between clock domains of the HMD and the handheld object may result in environmental tracking exposures and handheld object tracking exposures being incorrectly timed relative to the light pulses of the handheld object. This time uncertainty also may result in incorrectly fused data. Thus, various methods of optical time synchronization may be used to synchronize the clock domains of the HMD and handheld object.

Figure 14B:
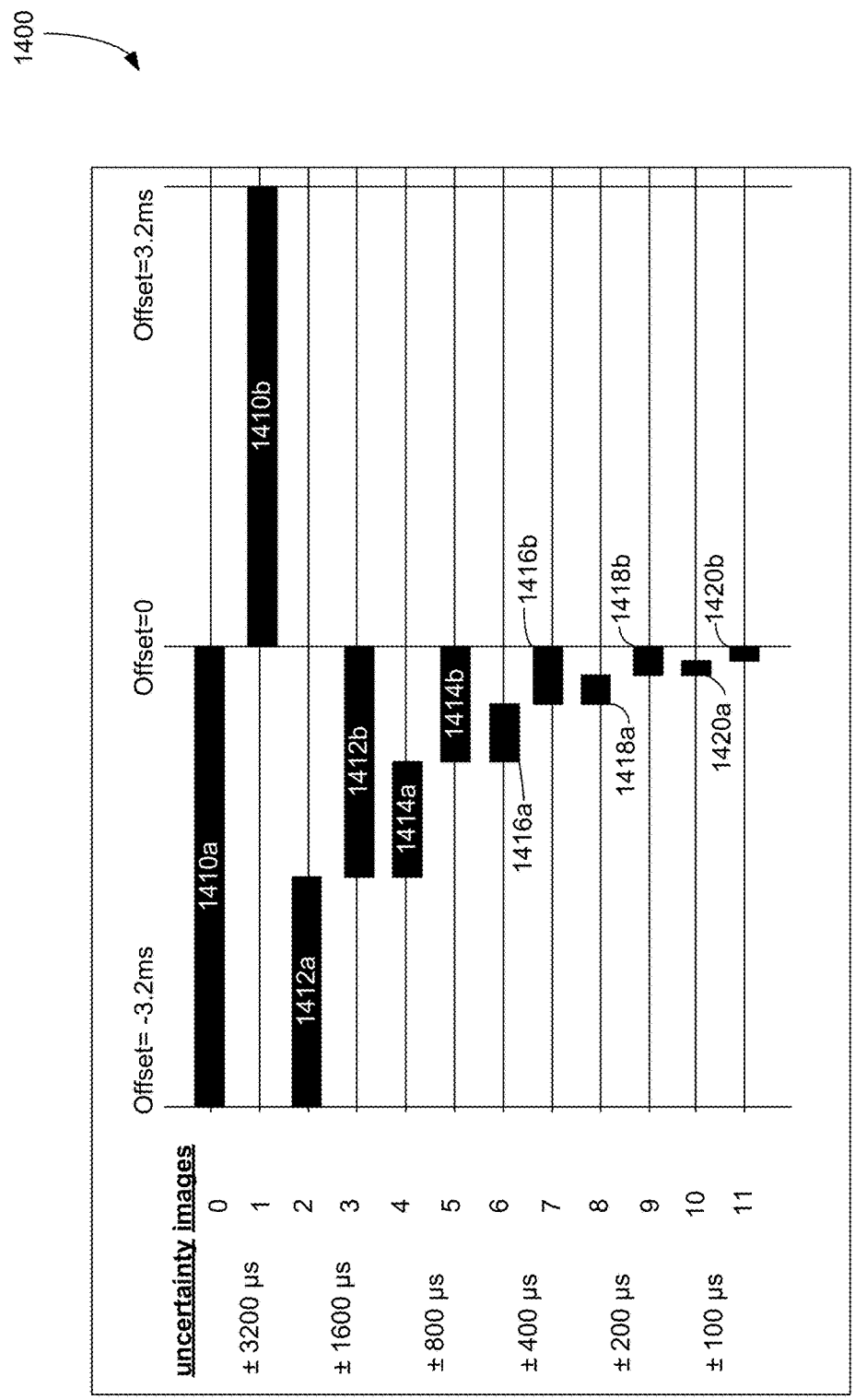

FIGS. 14A-14B schematically depict a first example of a method of optically synchronizing the clock domains of the HMD and the handheld object. The example of FIGS. 14A-14B may be referred to herein as a binary search process 1400. A binary search process 1400 may be initialized by determining an uncertainty interval duration, for example, by computing the roundtrip time between a host PC and the handheld controller over air, (e.g. Bluetooth) between a host PC and the HMD over wire (e.g. USB), or in any other suitable manner based upon a configuration of a system being utilized.

Once the uncertainty interval duration is understood, a binary search process 1400 may be performed by first pulsing one or more light sources of the handheld object on for a first portion 1402 of a time interval 1404, and pulsing the one or more light sources off for a second portion 1406 of the time interval 1404. During this time interval 1404, the HMD image sensing system that is shared for environmental tracking and handheld object tracking takes a handheld object tracking exposure 1408 in the time interval 1404, and determines whether the one or more light sources are on or off in the handheld object tracking exposure 1408. If a light pulse 1410 of the one or more light source is not detected in the exposure 1408, the image sensing system is determined to be out of phase with the light source pulse frequency, and another handheld object tracking exposure is taken in a different portion of the time interval 1404. Likewise, when the handheld object tracking exposure 1408 is in the same portion of the time interval 1404 as the light pulse 1410, the acquisition of another exposure may be omitted.

In either case, after it is determined which portion of the time interval 1404 contained the handheld object tracking exposure 1408, the width of the light pulse 1410 is reduced to a first subinterval of the first portion, by half in some examples, and the process is repeated for the shortened light pulse 1412. This process may be iteratively performed until a target light pulse width is reached. As shown in FIG. 14B, each portion of the uncertainty interval may be made to overlap with the other portion(s) of the uncertainty interval by an exposure time to ensure that one of the uncertainty intervals illuminates the entire handheld object tracking exposure. In the example of FIG. 14B, a duration of the light pulse 1410a is substantially half of an uncertainty interval ±3200 μs, while a duration of light pulse 1410b is substantially the other half of the uncertainty interval ±3200 μs. These two light pulses 1410a-1410b overlap in duration by the image exposure time such that a light pulse illuminates at least one of the handheld object tracking exposures (image 0, image 1) acquired. Upon locating the light pulse 1410a in image 0, the uncertainty interval, in this example, is split in half to ±1600 μs, and this process of reducing the light pulse width is iteratively performed until a target light pulse width 1420 is achieved.

Optical time synchronization between the HMD and the handheld object may also be achieved with a Phase-Locked Loop (PLL) state machine. Briefly, the light pulses and image sensing may be synchronized by shifting the timing of the light pulses and/or image acquisition based upon the relative intensities of light pulses detected in handheld object tracking exposures acquired during a ramp-up pulse and a ramp-down pulse.

Figure 15:
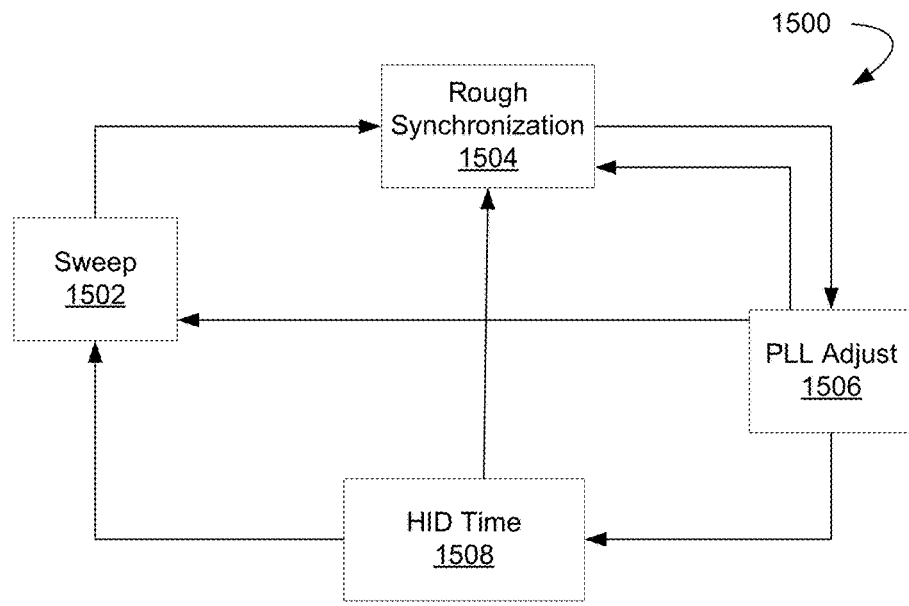
FIG. 15 shows a block diagram of an example PLL state machine for optical time synchronization.

FIG. 15 shows a block diagram depicting an example of a PLL state machine 1500 suitable for use in aligning the phases of the HMD image sensing system exposures and the handheld object light pulses. The example PLL State Machine 1500 cycles through states of sweep 1502, rough synchronization 1504, PLL adjust 1506, and optionally HID Time 1508, and light pulses are ramped such that one light pulse begins at a first intensity and is increased over a selected duration of time to a second intensity, and another light pulse decreases over time from the first intensity to the second intensity.

Figure 16:
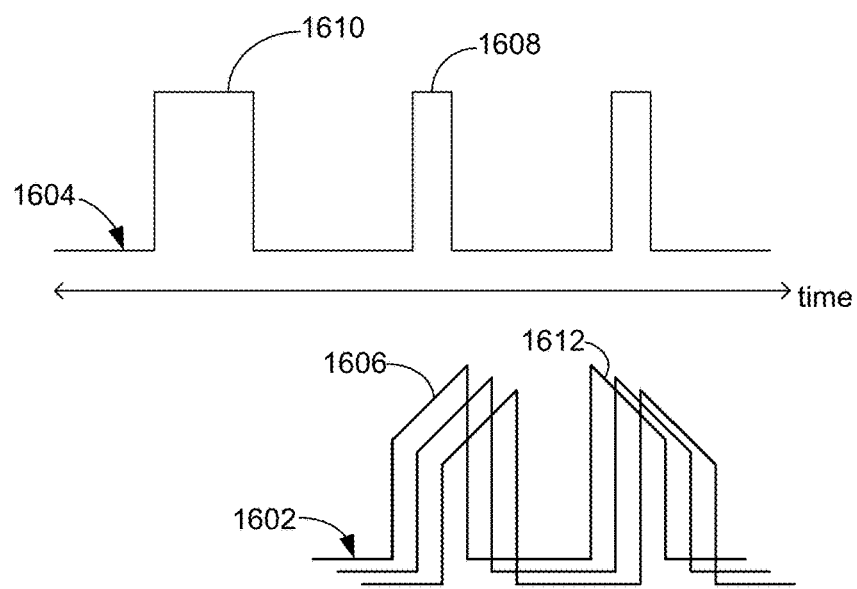
FIG. 16 schematically shows light pulses in an example sweep state for a PLL state machine.

The sweep state 1502 may begin based upon any suitable trigger, such as initialization and light sources being undetectable in handheld object tracking exposure(s) for a threshold duration (as measured by time or number of frames, for example). One example of the sweep state 1502 is shown schematically in FIG. 16, where a temporal position of a light pulse cycle 1602 over an exposure sequence 1604 may be moved forward and backward in time in order to detect a light pulse 1606 during at least one handheld object tracking exposure 1608 of the exposure sequence 1604. In the example of FIG. 16, the exposure sequence 1604 includes one environmental tracking exposure 1610 followed by two handheld object tracking exposures 1608, and the light pulse cycle 1602 includes a first light pulse 1606 having an up-ramp intensity and a second light pulse 1612 having a down-ramp intensity. It will be understood that, in other examples, any suitable exposure sequence and light pulse cycle may be used.

In some examples, light source brightness is maintained at a constant level during the sweep state 1502, while in other examples, the light source brightness varies during the sweep state 1502. A recursive search or binary search may be implemented during the sweep state 1502 in some examples to more quickly converge a light pulse 1606 with a handheld object tracking exposure 1608.

Figure 17:
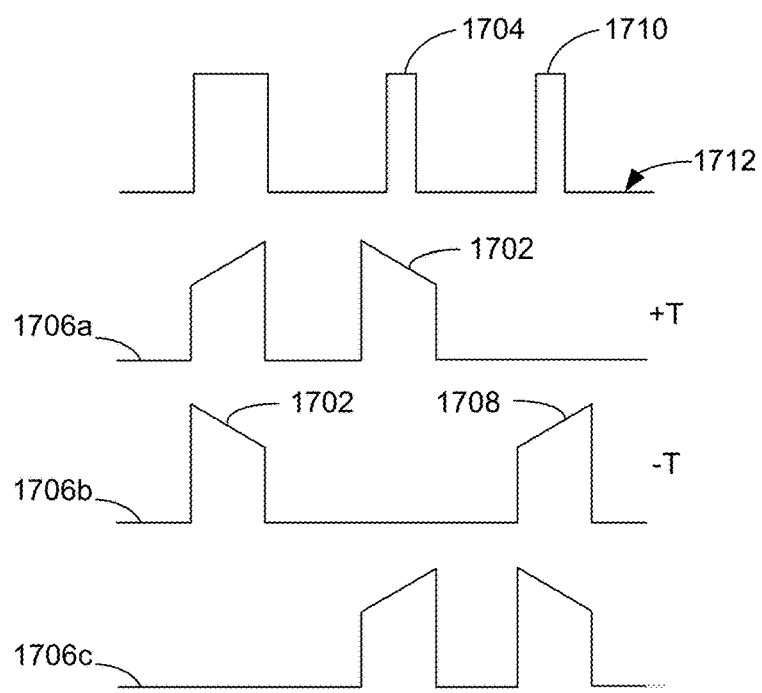
FIG. 17 schematically shows light pulses in an example rough synchronization state for a PLL state machine.

The rough synchronization state 1504, an example of which is illustrated schematically in FIG. 17, may be initiated when a constellation of light generated by the light source pulse is detected in one or more handheld object tracking exposures, such as one of every two consecutive handheld object tracking exposures in the sweep state. Once a first light pulse 1702 is detectable in a first handheld object tracking exposure 1704, in one or more light pulse cycles 1706a-1706c of the rough synchronization state 1504, the relative timing between the first light pulse 1702 and a second light pulse 1708 in the light pulse cycle is adjusted to overlap the second light pulse 1708 with a second handheld object tracking exposure 1710. In some examples, the rough synchronization state 1504 may continue, for example, until a constellation of light from the light pulses is detected in two consecutive handheld object tracking exposures, as shown in FIG. 17 by light pulses of the light pulse cycle 1706c overlapping consecutive handheld object tracking exposures of the exposure sequence 1712. Once two light pulses are detected in two handheld object tracking exposures of the exposure sequence, the PLL state machine 1500 may transition to the PLL adjust state 1506. In some examples, a constellation of light from the light pulses may become undetectable in handheld object tracking exposures, and the PLL state machine 1500 may transition to the sweep state 1502.

In some instances, a constellation of light may be undetectable in a handheld object tracking exposure due to reduced light source brightness. Thus, in some examples, a light source brightness may be varied over time in the rough synchronization state 1504 in such instances, which may help detect constellations of light from the light pulses and may limit the duration of the rough synchronization state 1504.

The PLL state machine 1500 may transition to the PLL adjust state 1506 when, for example, a constellation of light is detected in two consecutive handheld object tracking exposures. Once a light constellation is detected in both handheld object tracking exposures (or, more generally, in all handheld object tracking exposures, where more or fewer than two exposures are used per cycle), the PLL adjust state 1506 may distinguish the handheld object tracking exposures based upon the relative intensities of the light pulses detected in each exposure. For example, for light pulses having an up-ramp or a down-ramp intensity, the handheld object tracking exposure may appear brighter or dimmer based upon which portion of a ramped light pulse the exposure overlaps. Once handheld object tracking exposures acquired during ramp up and ramp down are distinguished, a timing offset between the light pulses in each light pulse cycle and the handheld object tracking exposure may be determined based upon the intensity difference between the ramp up image frame and the ramp down image frame. In some examples, a timing of an exposure sequence(s) and/or timing of light pulses emitted by the handheld object may be adjusted to correct for the determined timing offset.

Figure 18:
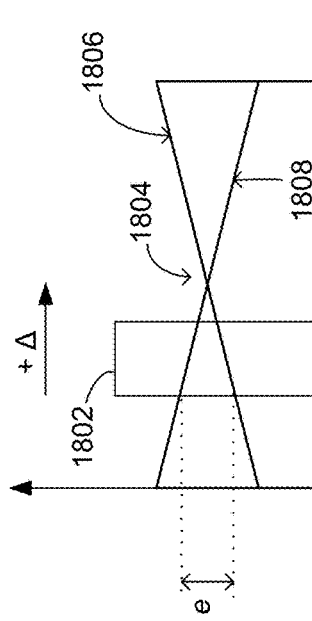
FIG. 18 shows a graph illustrating an example method for determining a timing offset in a PLL adjust state.

FIG. 18 shows an example method for calculating an error e in timing offset between a handheld object tracking exposure 1802 and a center 1804 of a ramped light pulse during the PLL adjust state 1506. The image sensing system acquires a sequence of handheld object tracking exposures in which ramped light pulses emitted by the plurality of light sources are detected. After acquiring a handheld object tracking exposure 1802 during each of an up-ramp light pulse 1806 and a down-ramp light pulse 1808, an intensity of the light sources in each image is compared. When a center of the handheld object tracking exposure 1802 overlaps the center 1804 of an up-ramp light pulse 1806 and the down-ramp light pulse 1808, the light source intensities may appear uniform (or within a threshold uniformity) in the images acquired, indicating that the light pulse sequence of the handheld object and exposure sequence are properly synchronized. Likewise, differences in intensities between these images indicates that the exposures and light pulses are out of synchronization. In the example of FIG. 18, the center 1804 of each ramped light pulse is offset from a center of the handheld object tracking exposure 1802, and the image acquired during the up-ramp light pulse 1806 will appear dimmer than the image acquired during the down-ramp light pulse 1808. The difference in image intensity e indicates the error in timing offset.

A negative feedback loop may be employed to minimize the error in timing offset, by applying corrections A related to the observed image intensity error e. In some examples, a proportional controller may be used where the relationship between the handheld object and the HMD is $\Delta=K_p*e$. Due to clock offset drift between the two devices being synchronized, there may be a steady state error when such a proportional controller is used. In some examples, introducing an integral component via a proportional-integral controller, such as that given by $\Delta=K_p*e+\int(K_i*e)dt$, may help to mitigate steady state error. The coefficients $K_p$ and $K_i$ are to be designed for a particular system, and depend on the slope of the light pulse ramp and the amount of noise present in the system. Sources of noise may include errors related to light intensity estimation, hand or head movement, and ambient lighting. In other examples, any other suitable control system may be used to minimize the offset error through the feedback loop.

The PLL adjust state 1506 is used to maintain alignment until the plurality of light sources become undetectable. However, if constellations of light from the light pulses are no longer detected in handheld object tracking exposures during the PLL adjust state 1506, then the PLL state machine 1500 may change to the sweep state 1502 or other suitable state for reestablishing synchronization.

Figure 19:
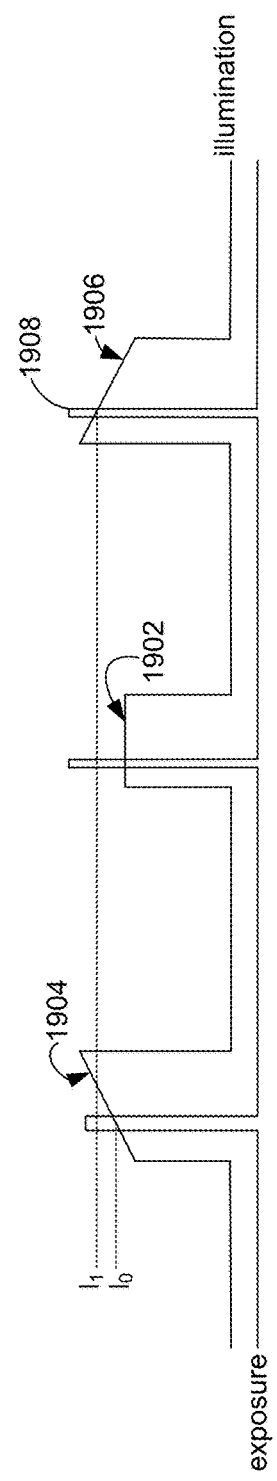
FIG. 19 schematically shows an example light pulses scheme for use in a PLL adjust state of a PLL state machine.

Image data noise, such as that arising from ambient light and motion of the handheld object relative to the HMD, may affect measurements of time uncertainty between the clock domains. To help reduce the effect of noise on the PLL adjust state 1506, in some examples, an absolute measurement of time uncertainty may be determined using two ramped light pulses over two consecutive handheld object tracking frames. Further, in some examples, a third light pulse of constant light intensity may be used between the up-ramp pulse and the down-ramp pulse. FIG. 19 schematically shows an example light pulse sequence including a light pulse 1902 of constant intensity positioned between an up-ramp light pulse 1904 and a down-ramp light pulse 1906. Such a constant intensity light pulse 1902 may have a known intensity, and thus be used to correct for ambient light and other sources of noise. The constant intensity light pulse 1902 also may help to distinguish the up-ramp 1904 and down-ramp 1906 light pulses based upon their known relative positions with respect to the constant intensity light pulse 1902. In other examples, two or more pulses of light of constant intensity may be used between ramped pulses.

Figure 20:
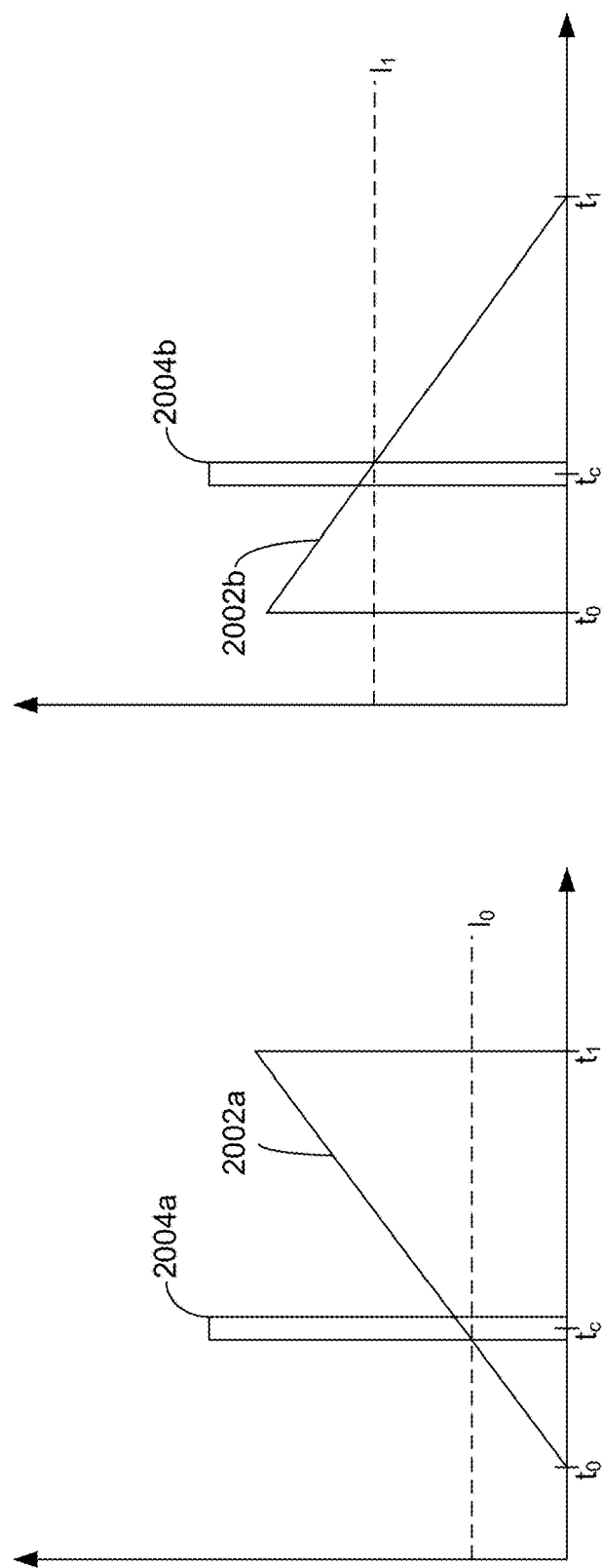
FIG. 20 shows graphs depicting an example method for calculating a timing offset in a PLL adjust state.

FIG. 20 shows a graphical depiction of an example method to calculate timing offset, $t_C$, in the PLL adjust state 1506 using a light pulse of constant intensity between two ramped light pulses 2002a-b over consecutive handheld object tracking exposures 2004a-b, wherein the constant intensity pulse is used to normalize the intensities of the signals received from the ramped light pulses 2002a-b. In this example, both the time and direction of offset may be determined. An example calculation for determining the timing offset $t_C$ is given below in equation (1). Offset calculations may be used to decrease width of light source pulse ramps, which may help to conserve power and reduce a perceived brightness of the visible light sources.

$$t_C = \frac{1}{2}\left(\frac{l_0 - l_1}{l_0 + l_1}\right)(t_1 - t_0) + \left(\frac{t_0 + t_1}{2}\right) \quad (1)$$

Where $t_c$ is a timing offset between light pulses and handheld object tracking exposures, $l_0$ is a location at which a center of a handheld object tracking exposure intersects a first ramped light pulse, $l_1$ is a location at which a center of another handheld object tracking exposure intersects a second ramped light pulse, to is a time at which each ramped light pulse begins, and ti is a time at which each ramped light pulse ends.

Dynamic brightness adjustment may also be used during the PLL adjust state 1506. For dynamic brightness, for each detected light source in an imaged constellation, the median amplitude is averaged over two consecutive handheld object tracking frames. The average amplitude then may be used to modify a duty cycle to target a desired light source amplitude.

An optional HID time state 1508 may be used in some examples to determine whether the PLL state machine 1500 transitions to the sweep state 1502 or the rough synchronization state 1504. This state refers to the above-mentioned synchronizing of the HMD and the handheld object clock domains by computing the roundtrip time between a host PC and the handheld object, for example, over air (e.g. Bluetooth), between a host PC and the HMD over wire (e.g. USB), or in any other suitable manner depending upon a system configuration. If this process provides a sufficiently small upper bound on the time offset uncertainty (e.g. +/−3 ms), then the HID time state 1508 may be used to skip the sweep state 1502 and may instead transition to the rough synchronization state 1504.

Figure 21:
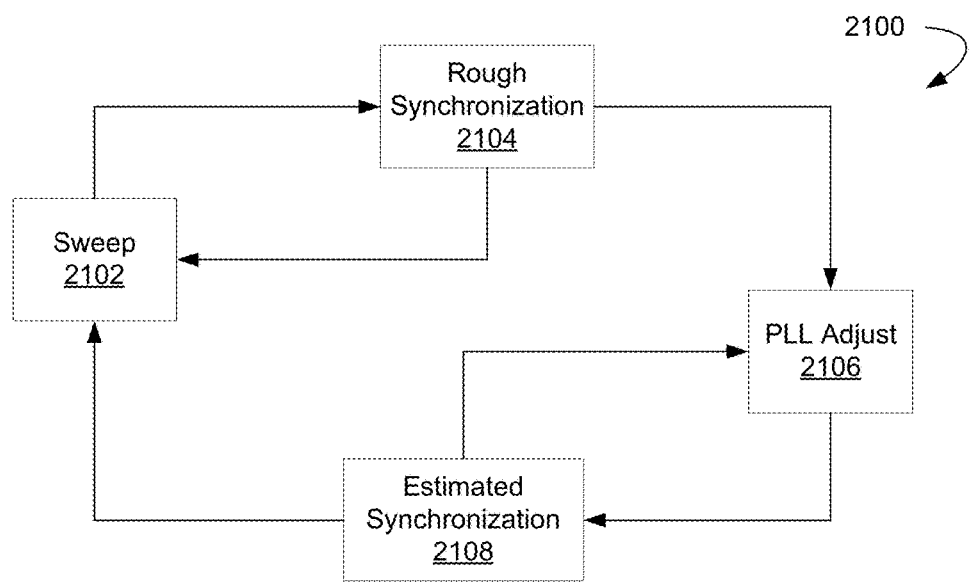
FIG. 21 schematically shows another example PLL state machine.

FIG. 21 shows another example of a PLL state machine 2100. PLL state machine 2100 cycles through a sweep state 2102, a rough synchronization state 2104, a PLL adjust state 2106, and an estimated synchronization state 2108. The sweep state, rough synchronization state, and PLL adjust state for the example PLL state machine 2100 may operate as described above for the example PLL state machine 1500.

When a light pulse(s) becomes undetectable in a handheld object tracking exposure(s) during the PLL adjust state 2106, PLL state machine 2100 estimates the drift between the handheld object clock domain and the HMD clock domain in the estimated synchronization state 2108 for a duration before reverting to the sweep state 2102. In some examples, the drift between clock domains may be estimated for a threshold duration of time. If a light pulse is detected in a handheld object tracking exposure during the estimated synchronization state 2108, the PLL state machine 2100 may return to the PLL adjust state 2106 to readjust the relative timing between clock domains of the HMD and the handheld object. On the other hand, if the light sources remain undetected for the duration of the estimated synchronization state 2108, the PLL state machine 2100 may return to the sweep state 2102 to reestablish a synchronization.

FIG. 22 shows another example light pulse cycle 2202 and exposure sequence 2204. In this example, the exposure sequence 2204 includes two shorter handheld object tracking exposures 2206a-b followed by a longer environmental tracking exposure 2208. The light pulse cycle 2202 includes an up-ramp light pulse 2210 timed to illuminate a first handheld object tracking exposure 2206a, a down-ramp light pulse 2212 timed to illuminate a second handheld object tracking exposure 2206b, and an optional anti-flicker light pulse 2214. The anti-flicker light pulse 2214 may be included in light pulse cycles for one or more of the sweep state, the PLL adjust state, and the estimated synchronization state, for example. As shown in FIG. 22, the anti-flicker light pulse 2214 may temporally overlap the environmental tracking exposure 2208 and thus may be somewhat visible in image frames corresponding to HMD pose determination, but may be timed such that the intensity does not interfere unsuitably with the HMD pose determination process. The anti-flicker pulse 2214 may be omitted during the rough synchronization state, in some examples, when relative timing is adjusted between light pulses in a light pulse cycle.

Another example method of synchronizing the HMD clock and/or host clock with a handheld object clock involves modulating the light sources on the handheld object when the handheld object is in motion (or predicted to be in motion based upon prior and/or current motion) relative to the HMD and comparing an image capturing the modulation to an expected image. Based upon differences between the captured image and the expected image, such as a light pattern detected and a light pattern expected, a timing difference between the clocks may be determined.

In such a process, the HMD camera exposure is set to a period of time longer than that used to estimate a single handheld object pose. During the period of the exposure, one or more light sources on the handheld device are pulsed multiple times to generate a detectable pattern in the handheld object tracking exposure. The HMD either specifies the pattern to the handheld object, or otherwise is informed of the pattern by a host computer, and thus may compare the detected pattern to an expected pattern. In either instance, the pattern is communicated to the handheld object in advance so that the HMD and the handheld object are synchronized within a suitable time based on pose uncertainty with regard to the selected pattern. The pattern detection may be performed by one camera, or multiple cameras, of the HMD.

The handheld object further may perform the pattern with a single light source or with a group of light sources. Performing the pattern with one light source may increase a robustness of tracking information in the frame, whereas performing the pattern with multiple light sources may increase a robustness of time estimates. The patterns and actions may be composed over time in a statistical estimation framework.

Figure 23:
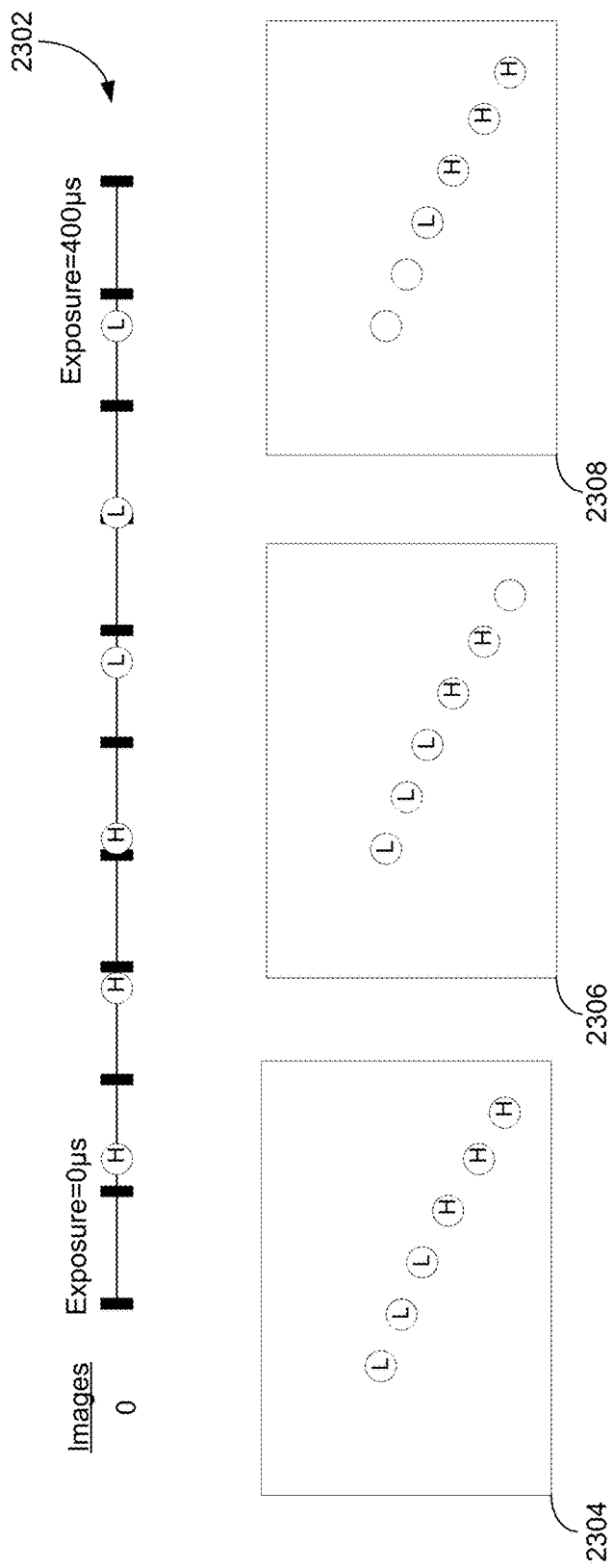
FIG. 23 schematically illustrates an example method of performing of optical time synchronization via light pulse modulation.

FIG. 23 schematically illustrates an example of such an approach. In this example, the handheld object tracking exposure time of the cameras used to capture an image of the light source modulation is set to 400 microseconds, which is longer than the exposure time for estimating a single pose of the handheld object. In the light pulse pattern 2302 of FIG. 23, a light source is pulsed three times at higher intensity (indicated by "H" in the light pulse pattern 2302), and then three times at lower intensity (indicated by "L" in the light pulse pattern 2302) during the 400-microsecond exposure time.

Where camera(s) of the HMD and the light pulse cycles of the handheld object are synchronized, all light pulses are visible in the image, as shown in FIG. 23 by handheld object tracking exposure 2304. This image may indicate that synchronization between the HMD and the handheld object is within a desired tolerance for adequate pose determination. On the other hand, where one or more higher intensity light pulses are not imaged, as shown by handheld object tracking exposure 2306, then the handheld object clock is advancing faster than the host clock (where a host computing device is used) and/or the HMD clock. Likewise, if one or more lower intensity light pulses are missing in the image captured, such as in handheld object tracking exposure 2308, then the handheld object clock is advancing more slowly than the host clock and/or HMD clock, depending upon a system configuration used. Further, a quantity of missing high or low intensity points may indicate how much of an adjustment to make to establish synchronicity within the desired tolerance.

Yet another example method of synchronizing a handheld object clock with an HMD and/or host device clock involves acquiring a plurality of handheld object tracking exposures in which an illumination of the plurality of light sources in each exposure is adjusted by a different uncertainty time relative to an exposure time, and determining the time offset between the clock domains of the handheld object and the HMD based upon a brightness of each handheld object tracking exposure acquired. Determining the time offset may comprise, in some examples, performing a statistical analysis of image results to determine which uncertainty time produces a highest intensity. Such a method may be referred to herein as an active offset search.

As one example of an active offset search, a fixed handheld object tracking exposure may be used with an illumination pulse of similar duration. In this example, if the uncertainty of time synchronization between the HMD and the handheld object is +/−50 microseconds, then a number of images may be captured in which the illumination pulses are intentionally offset forwards or backwards in time by an amount selected based upon this uncertainty. A time offset that coincides with the clock drift may be observed as a brighter image. Similarly, a time offset in the direction opposite to clock drift may result in a dark or unobservable image.

Figure 24:
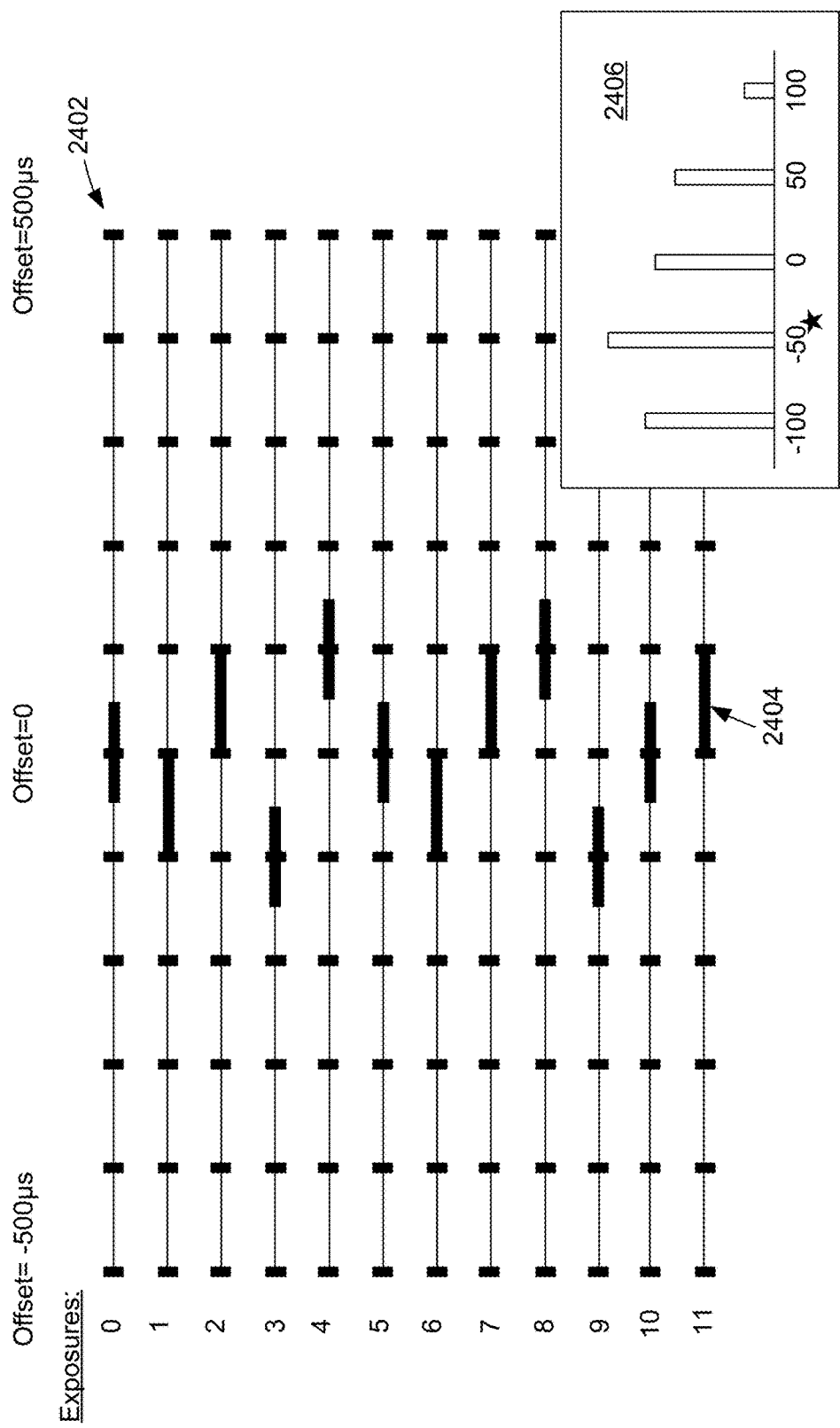
FIG. 24 shows a schematic depiction of an example method of performing optical time synchronization via active offset search.

FIG. 24 schematically shows a sequence of handheld object tracking exposures 2402 and illumination offsets 2404 used for the series of handheld object tracking exposures 2402 to create a statistical estimation framework for time clock synchronization. In this example, a time synchronization of −50 microseconds is estimated in an accumulation buffer 2406. While not shown in this figure, the handheld object tracking exposure may be for a same time duration as the light pulse width, and may be centered at offset=0. The method involves performing a series of forward and backward shifts of the light pulse timing to determine a time offset of maximum intensity response in the resulting handheld object tracking exposure, and this time offset may represent an offset in which the clocks are suitably synchronized.

As mentioned above, the handheld object pose relative to the HMD pose may be determined using such methods as a rigid body transform or epipolar line fitting. However, over time, the image sensing system of the HMD used to acquire image data for pose estimation may experience perturbations. As examples, HMDs may exhibit thermal variation from use, thermal variation from environmental factors, drops, and vibrations, all of which may cause mechanical and optical deformation in the device. Such deformation may make fitting detected light constellation patterns via rigid rotation transformation, epipolar line fitting, or other fitting model more difficult. Cameras in a multicamera system, such as a stereo camera arrangement, may move with respect to one another (e.g. rotations and translations) and may also move with respect to an IMU (when present). Camera lenses also may move and distort relative to an image sensor. All such deformations and perturbations may impact tracking quality.

Thus, examples are described herein that relate to calibrating a stereo camera arrangement of a HMD during use. The described calibration methods may be performed during ordinary device use, for example as a background process, and thus may not impact a user experience when being performed. While described in the context of calibration during ordinary use, it will be understood that the disclosed examples also may be used in an initial calibration (e.g. a factory calibration).

One possible method of calibrating may involve imaging environmental features via the stereo camera arrangement, comparing the location of an environmental feature in corresponding left-camera and right-camera images, and calibrating based on an observed offset of the environmental feature in the images from expected relative positions of the feature. This process may be performed, for example, by determining a plurality of feature points in each image, determining a three-dimensional location of each feature point in one of the images via triangulation, and then performing a search for a companion pixel in the other image by searching along a distorted epipolar line. When cameras in the stereo camera arrangement are in calibration, companion pixels will be located along epipolar lines (each feature point detected has its own corresponding epipolar line). Likewise, when the cameras are out of calibration, companion pixels will be offset from the epipolar line(s) of the other camera. An optimization function such as a Kalman filter, a sliding window bundle adjustment, and/or a recursive Gauss-Newton filter may be used to optimize this fit, and thus to determine a calibration for the stereo camera arrangement.

Where environmental features are used to calibrate an HMD camera system, an optimization may utilize additional variables to compensate for the true depths of feature points in the three-dimensional scene being unknown. These additional variables may increase computing time and add uncertainty to the optimization algorithm. Further, when locations of the pixels are determined via triangulation, the optimization algorithm may not be able to adequately distinguish baseline separation changes between cameras in the multicamera arrangement.

Thus, when one or more handheld object(s) are detectable in a field of view of the HMD, light sources on the handheld object may be used as feature points for calibration. As the geometry of the handheld object and light sources is known to the HMD, the resulting optimization may be more constrained and thus converge more quickly. Such a calibration method also may help to determine baseline separation changes for a stereo camera arrangement.

Figure 25:
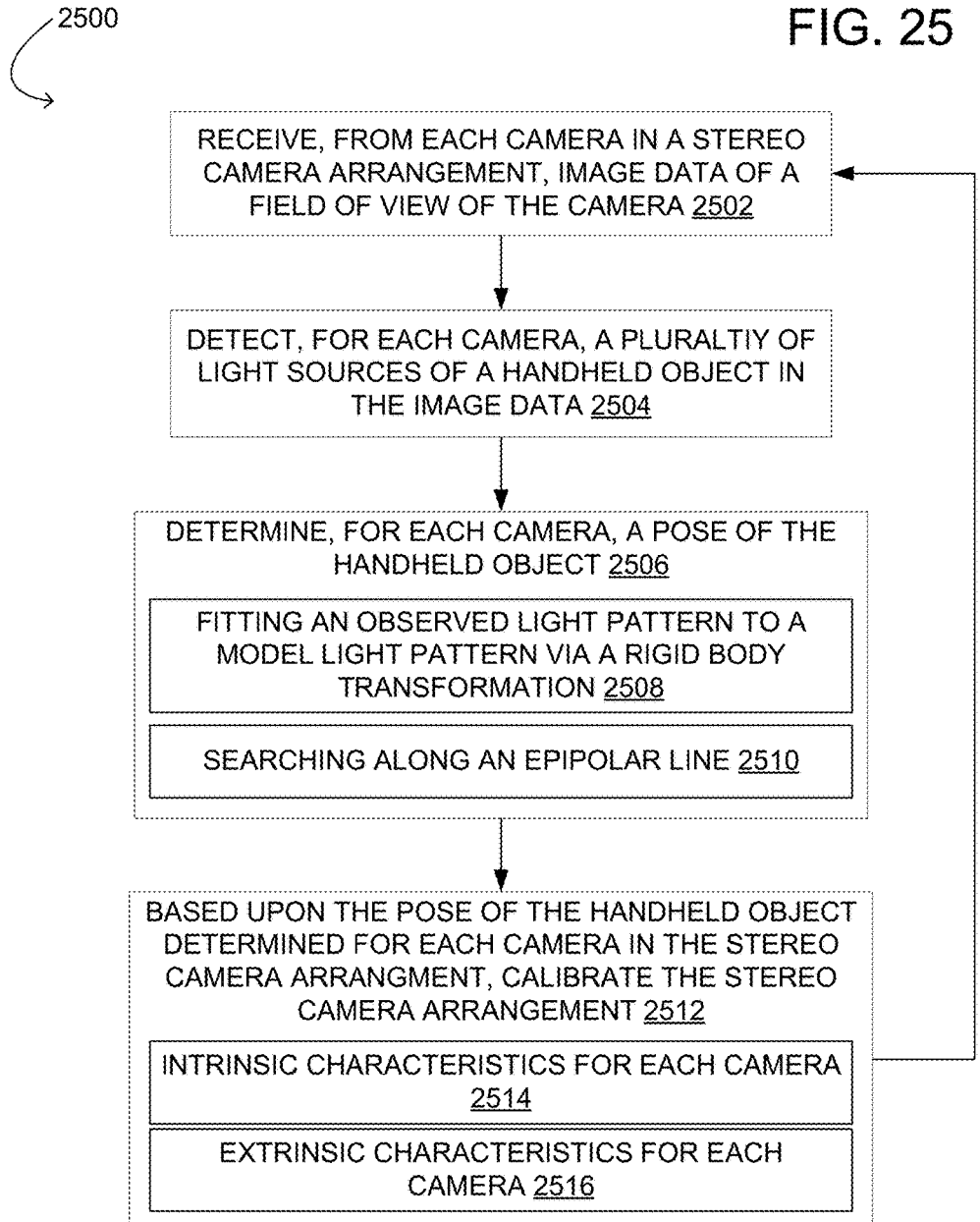
FIG. 25 shows a flowchart illustrating an example method of determining a calibration for a stereo camera arrangement.

FIG. 25 shows an example method 2500 for calibrating a stereo camera arrangement on an HMD. Method 2500 may be performed on a computing device, such as a HMD or host computer, via the execution of computer-readable instructions. At 2502, method 2500 comprises, for each camera in the stereo camera arrangement, receiving image data of a field of view of the camera. In some examples, the image data may comprise a sequence of handheld object tracking exposures and environmental tracking exposures in a 1:1 ratio. In other examples, the image data may comprise a greater number of handheld object tracking exposures than environmental tracking exposures, or a greater number of environmental tracking exposures than handheld object tracking exposures, depending upon whether a higher frame rate is desired for either type of exposure.

At 2504, method 2500 comprises, for each camera in the stereo camera arrangement, detecting a plurality of light sources of a handheld object in the image data. Any suitable feature detection method may be used to detect the plurality of light sources. As an example, an image acquired during a handheld object tracking exposure may be thresholded to locate candidate bright spots in the image, and a distribution may be fit (e.g. a Gaussian) to each candidate bright spot to locate a pixel center of each candidate bright spot, on a pixel or sub-pixel resolution in various examples.

Based upon the plurality of light sources detected, method 2500 comprises, at 2506, for each camera, determining a pose of the handheld object (e.g. as expressed by labeling each light source of the handheld object with a unique identifier). Any suitable method may be used to determine the pose. For example, as indicated at 2508, determining the pose of the handheld object may comprise fitting an observed light pattern to a model light pattern via a rigid body transformation. As the HMD and the handheld object may each have an initial calibration, the HMD may expect to detect a model light pattern of the handheld object. As such, a statistical analysis may analyze variations between the model light pattern and the observed light pattern, observed over multiple handheld object tracking exposures, to determine an error in the calibration. As another example, determining the pose of the handheld object may comprise searching along an epipolar line, as indicated at 2510. Offsets between a detected corresponding point or pixel in an image from its expected location on an epipolar line may provide an indication of error in the calibration.

Method 2500 further comprises, at 2512, calibrating the stereo camera arrangement based upon the pose of the handheld object determined for each camera in the stereo camera arrangement. Calibrating the stereo camera arrangement may comprise, at 2514, calibrating one or more intrinsic camera characteristics for each camera of the stereo camera arrangement. Example intrinsic camera characteristics include lens distortion, focal length, and principal point. Calibrating the stereo camera arrangement further may comprise, at 2516, calibrating one or more extrinsic camera characteristics for each camera in the stereo camera arrangement. Example extrinsic camera characteristics include a rotation and a translation of one camera relative to another camera (e.g. a transform between cameras in the image sensing system). Intrinsic and extrinsic camera characteristics may be modeled as mathematical functions in an optimization algorithm. Mathematical tests may be applied to these mathematical functions, such as in a recursive optimization framework or in a bundle adjustment, to determine whether each function is in or out of calibration. This determination may comprise using numeric functions of error in the camera observations to predict how much error is in each parameter of the intrinsic and the extrinsic camera characteristics. Error in each calibration parameter may indicate error in pose determination, and thus the HMD may compute pose based upon the updated calibration parameters. In some examples, a single exposure may be insufficient to account for all possible calibration parameters, so this mathematical framework may be used within a recursive optimizer.

A calibration process may be performed at any suitable frequency. In some examples, calibration may occur 6-10 times per minute, or even over 10 times per minute. In other examples, calibration may be performed less frequently. Further, as the light source locations and thus the constellation patterns detected of the handheld object are known, calibration may be performed even where cameras do not have overlapping view of the handheld object, as long as a portion of the handheld object is at least sometimes in view of each camera.

In some examples, inertial observations may be predicted by knowledge of the HMD pose relative to the handheld object. Multiple observations of handheld object pose by one or more cameras configured with the HMD may give estimates over time to refine interpretation of IMU data (e.g. to recalibrate the IMU). In another example, the handheld object may be stationary. In yet another example, both the HMD and the controller may be moving, and an optimization may be performed that may jointly optimize handheld object poses relative to the HMD, HMD poses relative to the stationary environment, and a set of IMU parameters.

Handheld objects also may experience perturbations over time that impact tracking quality. As examples, handheld objects may exhibit thermal variation from use and/or environmental factors, or may experience drops and vibrations, all of which may cause mechanical and optical deformations in the handheld object. Light sources on the handheld objects may also move with respect to one another, and/or with respect to the IMU of the handheld object, due to rotations and translations. Further, lenses of the light sources may reduce HMD accuracy and reduce use comfort. Additionally, factory processes may introduce assembly artifacts as the tolerances for accurate assembly may be small. As estimated calibration parameters of a handheld object shift, tracking quality may degrade, even with initial factory calibration.

As such, various methods may be implemented to recalibrate the calibration parameters of a handheld object. Example calibration parameters include parameters related to light source extrinsic characteristics (e.g. the position of each light source with respect to other light sources on the handheld object), IMU extrinsic characteristics (e.g. the position of the IMU with respect to a light source constellation), and IMU intrinsic characteristics (e.g. bias of gyrometer, bias of accelerometer, mixing matrices, etc.).

In one example, camera observations of the handheld object may be modeled using mathematical functions. A natural function of calibrations may require accurate knowledge of the light source patterns and normal vector orientations for the direction of light. Suitable tests may be performed on these functions to determine if they may be out of calibration, or in calibration. Similarly, inertial observations may be predicted based on knowledge of the handheld object pose in a stationary world-locked coordinate system. Multiple observations of handheld object pose by the HMD cameras, combined with the HMD pose in the world, may give estimates at multiple points in time that may refine how the IMU data is interpreted, which may be used to recalibrate the IMU. HMD pose in the world may be the identity transform in the case of a stationary HMD, or computed by an HMD tracking system (inside-out or outside-in). For example, if the IMU consistently reports data that is mismatched from optical observations, calibration parameters may be adjusted as needed to correct for IMU biases and make IMU output consistent with the optically determined pose of the handheld object.

A natural function of calibrations may require accurate knowledge of the light source constellations and normal vector orientations for direction of light. A secondary function may be the light source field of illumination levels. For example, knowledge of an angle of illumination of 50 degrees may indicates an illumination level of 50%.

As the HMD makes a sequence of observations, the HMD may determine that alternative parameters may make the observations more likely. For example, after a handheld object is dropped and experiences a deformation in light source positions on the handheld object, the HMD may observe a light pattern that differs from the model light pattern, and may recompute the constellation positions and update one or more calibration parameters for the handheld object. The tracking system on the HMD may use new estimates of light source positions, normal, illumination fields, and IMU parameters to refine future tracking and pose estimates.

Figure 26:
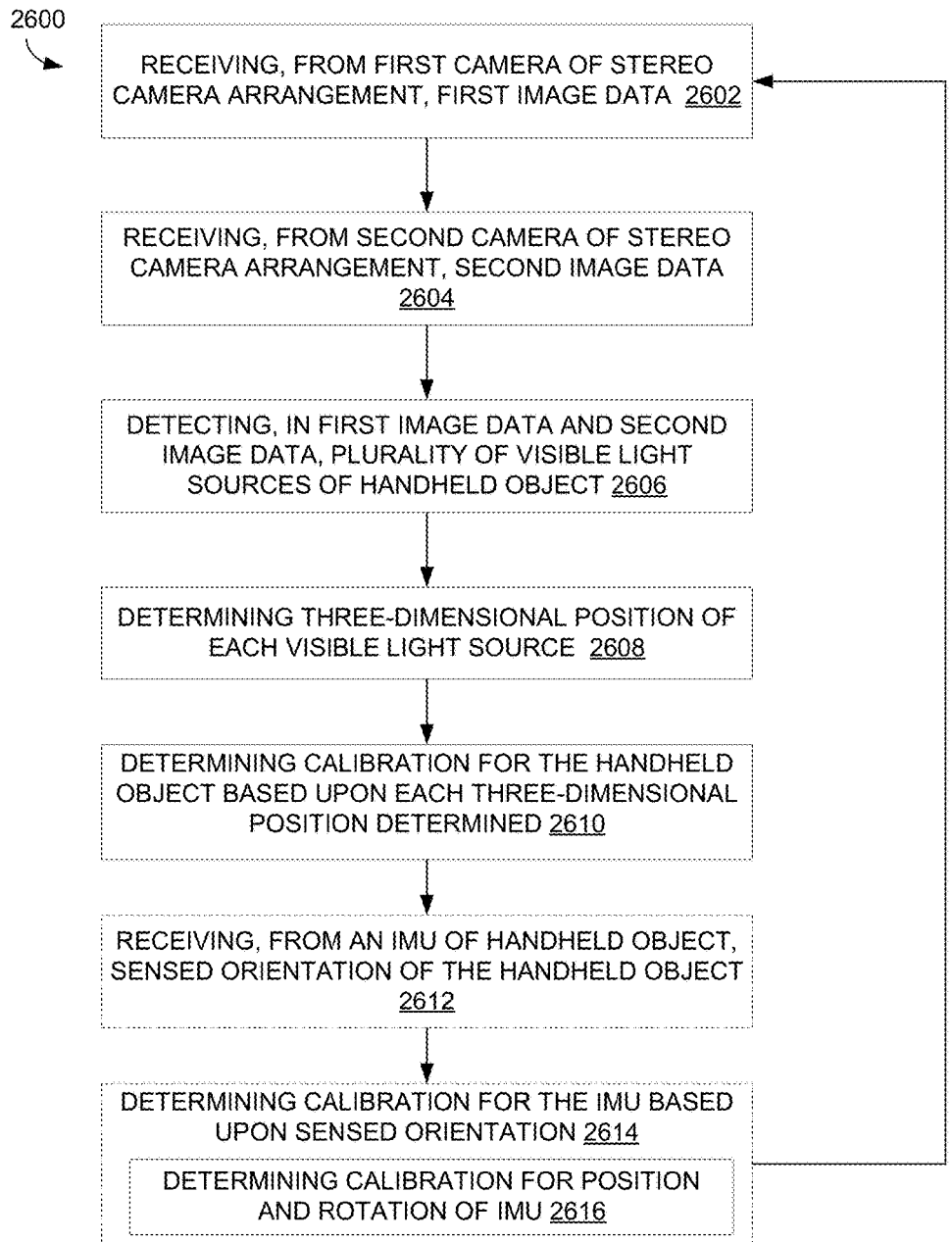
FIG. 26 shows a flowchart illustrating an example method of determining a calibration for a handheld object.

FIG. 26 illustrates an example method 2600 for determining a calibration for a handheld object via a HMD comprising a stereo camera arrangement. Method 2600 may be performed on a computing device via execution of instructions stored on the computing device such as via a processor of the HMD or a host computer. Method 2600 comprises, at 2602, receiving, from a first camera of the stereo camera arrangement, first image data from a perspective of the first camera, and at 2604, receiving, from a second camera of the stereo camera arrangement, second image data from a perspective of the second camera. The first image data and the second image data may be obtained by the first and second cameras at the same time, and may comprise any suitable exposure sequence and frame rate(s).

At 2606, method 2600 comprises detecting, in the first image data and the second image data, a plurality of light sources of the handheld object. Any suitable feature detection method may be used to detect the plurality of light sources, including but not limited to those described above (e.g. thresholding, distribution fitting, sub-pixel refinement, etc.). Method 2600 further comprises, at 2608, determining a three-dimensional position of each light source of the plurality of light sources detected. Determining the three-dimensional position may comprise, for example, determining a three-dimensional position of each light source via stereo imaging techniques and then comparing the determined positions to model positions. As another example, determining the three-dimensional position may comprise utilizing a rigid body transformation to fit the observed light pattern to a three-dimensional model. In either case, it may be determined that the observed pattern cannot be fit to the model pattern with a suitably low error, which may indicate a need for calibration.

Accordingly, at 2610, method 2600 comprises determining a calibration for the handheld object based upon each three-dimensional position determined. In some examples, determining the calibration comprises utilizing one or more of a Kalman filter, a sliding window bundle adjustment, and/or a recursive Gauss-Newton filter, to update position information (e.g. rotation and/or orientation information) regarding each individual light source. In such examples, light patterns observed over multiple handheld object tracking exposures may be used to build a robust estimate for displacement experienced by the light sources of the handheld object.

At 2612, method 2600 may comprise receiving, from an IMU of the handheld object, a sensed orientation of the handheld object. In some examples, the sensed orientation of the handheld object as indicated by the IMU over time may be used to help determine a change in orientation, and thus a change in pose, of the handheld object. Method 2600 may comprise, at 2614, determining a calibration for the IMU based upon the sensed orientation. As discussed above, the IMU and light sources may rotate and/or translate with respect to each other. Accordingly, determining the calibration for the IMU may comprise, at 2616, determining a calibration for one or more of the position and the rotation of the IMU.

In some examples, determining a calibration for the stereo camera arrangement and determining a calibration for the handheld object may be performed simultaneously. In such examples, the optimization framework (e.g. Kalman filter and/or other algorithms mentioned above) may be used to solve calibration parameters for both types of calibrations simultaneously, and thus may streamline updating calibration parameters for each device. In other examples, the calibrations may be determined separately. In yet other examples, the parameters may be solved together in an alternating manner, where variables for one calibration process impact the other calibration process.

The methods and processes described herein may be tied to a computing system of one or more computing devices, such as a head-mounted device or a host computer. In particular, such methods and processes may be implemented as a computer-application program or service, an application-programming interface (API), a library, and/or other computer-program product.

Figure 27:
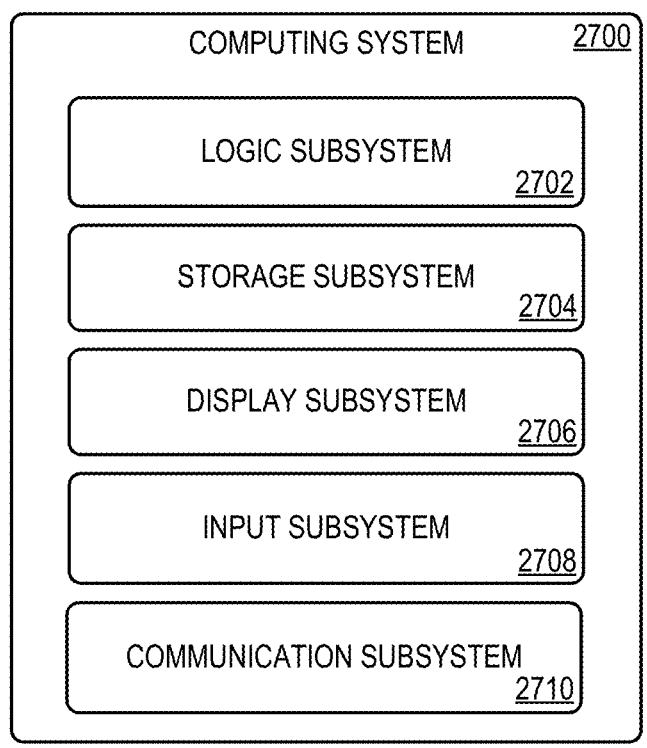
FIG. 27 is a block diagram showing an example computing system.

FIG. 27 schematically shows a non-limiting embodiment of a computing system 2700 that can enact one or more of the methods and processes described above. Computing system 2700 is shown in simplified form. Computing system 2700 may take the form of one or more personal computers, server computers, tablet computers, home-entertainment computers, network computing devices, gaming devices, mobile computing devices, mobile communication devices (e.g., smart phone), and/or other computing devices, such as head-mounted display device 102, handheld object 106, and host computing device 108.

Computing system 2700 includes a logic subsystem 2702 and a storage subsystem 2704. Computing system 2700 may optionally include a display subsystem 2706, input subsystem 2708, communication subsystem 2710, and/or other components not shown in FIG. 27.

Logic subsystem 2702 includes one or more physical devices configured to execute instructions. For example, logic subsystem 2702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 2702 may include one or more processors configured to execute software instructions. Additionally or alternatively, logic subsystem 2702 may include one or more hardware or firmware logic machines configured to execute hardware or firmware instructions. Processors of logic subsystem 2702 may be single-core or multi-core, and the instructions executed thereon may be configured for sequential, parallel, and/or distributed processing. Individual components of logic subsystem 2702 optionally may be distributed among two or more separate devices, which may be remotely located and/or configured for coordinated processing. Aspects of logic subsystem 2702 may be virtualized and executed by remotely accessible, networked computing devices configured in a cloud-computing configuration.

Storage subsystem 2704 includes one or more physical devices configured to hold instructions executable by logic subsystem 2702 to implement the methods and processes described herein. When such methods and processes are implemented, the state of storage subsystem 2704 may be transformed—e.g., to hold different data.

Storage subsystem 2704 may include removable and/or built-in devices. Storage subsystem 2704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 2704 may include volatile, nonvolatile, dynamic, static, read/write, read-only, random-access, sequential-access, location-addressable, file-addressable, and/or content-addressable devices.

It will be appreciated that storage subsystem 2704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 2706 and storage subsystem 2704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 2706 may be used to present a visual representation of data held by storage subsystem 2704. This visual representation may take the form of a graphical user interface (GUI). As the herein described methods and processes change the data held by the storage machine, and thus transform the state of the storage machine, the state of display subsystem 2706 may likewise be transformed to visually represent changes in the underlying data. Display subsystem 2706 may include one or more display devices utilizing virtually any type of technology. Such display devices may be combined with logic subsystem 2702 and/or storage subsystem 2704 in a shared enclosure, or such display devices may be peripheral display devices.

When included, input subsystem 2708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2710 may be configured to communicatively couple computing system 2700 with one or more other computing devices. Communication subsystem 2710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2700 to send and/or receive messages to and/or from other devices via a network such as the Internet.

Another example provides a handheld object configured for providing user input to a head-mounted device, the handheld object comprising a body, a plurality of visible light sources arranged on the body in an arrangement trackable by a vision system of the head-mounted device, and a controller configured to control a brightness of one or more visible light sources of the plurality of visible light sources. The controller may be additionally or alternatively configured to control a brightness of one or more visible light sources based on a signal from the head-mounted device. The controller may be additionally or alternatively configured to control a brightness of one or more visible light sources based on signal from a local motion sensor signal. The controller may be additionally or alternatively configured to control a brightness of one or more visible light sources by changing a duty cycle for the one or more visible light sources. The controller may be additionally or alternatively configured to change the duty cycle at a sufficient rate to hide flicker from the human eye. The controller may be additionally or alternatively configured to control a brightness of one or more visible light sources by applying a same pulse-width modulation change to all of the plurality of visible light sources. The controller may be additionally or alternatively configured to control a brightness of the one or more visible light sources by applying different pulse-width modulation change to different visible light sources. The controller may be additionally or alternatively configured to control a brightness of the one or more visible light sources by turning off some visible light sources of the plurality of visible light sources and illuminating other visible light sources of the plurality of visible light sources.

Another example provides a head-mounted device, comprising an image sensor, a logic device configured to execute instructions, and a storage device comprising instructions executable by the logic device to receive image data from the image sensor, in the image data, detect a set of light sources of a plurality of visible light sources arranged on a handheld object, and send a control signal to the handheld device to modulate a brightness of one or more light sources of the plurality of light sources. The control signal may be additionally or alternatively determined based on an apparent brightness of one or more of the light sources of the set of light sources in the image data. The control signal may be additionally or alternatively determined based upon one or more of a distance of the handheld object from head-mounted device and an angular location of the handheld object in a field of view of the image sensor. The control signal may be additionally or alternatively based on an orientation of the handheld device relative to the head-mounted device. The control signal may be additionally or alternatively configured to apply a same change in brightness to all visible light sources of the plurality of visible light sources. The control signal may be additionally or alternatively configured to apply different brightnesses to two or more visible light sources. The control signal may be additionally or alternatively configured to apply different brightnesses based on differences in locations of the two or more visible light sources on the handheld object. The control signal may be additionally or alternatively configured to turn off a subset of visible light sources and illuminate other visible light sources of the plurality of visible light sources based upon the subset being out of view of the image sensor.

Another example provides a handheld object configured for providing user input to a head-mounted device, the handheld object comprising a body, an inertial motion sensor configured to provide a motion signal related to changes in position and orientation of the handheld object, a plurality of visible light sources arranged on the body in an arrangement trackable by a vision system of the head-mounted device, and a controller configured to control a brightness of one or more visible light sources of the plurality of visible light sources based at least on the motion signal. The controller may be additionally or alternatively configured to control a brightness of one or more visible light sources based on a signal from the head-mounted device. The controller may be additionally or alternatively configured to control a brightness of one or more visible light sources by changing a duty cycle of power provided to each of the one or more visible light sources. The controller may be additionally or alternatively configured to control a brightness of one or more visible light sources by turning off a subset of visible light sources of the plurality of visible light sources while illuminating another subset of visible light sources of the plurality of visible light sources.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A handheld object configured for providing user input to a head-mounted device, the handheld object comprising:
   a body;
   a plurality of visible light sources arranged on the body in an arrangement trackable by a vision system of the head-mounted device; and
   a controller configured to receive from an external device a control signal, and based on the control signal received from the external device, control a brightness of one or more visible light sources of the plurality of visible light sources.

2. The handheld object of claim 1, wherein the controller is configured to control a brightness of one or more visible light sources based on a signal from the head-mounted device.

3. The handheld object of claim 1, wherein the controller is configured to control a brightness of one or more visible light sources based on signal from a local motion sensor signal.

4. The handheld object of claim 1, wherein the controller is configured to control a brightness of one or more visible light sources by changing a duty cycle for the one or more visible light sources.

5. The handheld object of claim 4, wherein the controller is configured to change the duty cycle at a sufficient rate to hide flicker from the human eye.

6. The handheld object of claim 1, wherein the controller is configured to control a brightness of one or more visible light sources by applying a same pulse-width modulation change to all of the plurality of visible light sources.

7. The handheld object of claim 1, wherein the controller is configured to control a brightness of the one or more visible light sources by applying different pulse-width modulation change to different visible light sources.

8. The handheld object of claim 1, wherein the controller is configured to control a brightness of the one or more visible light sources by turning off some visible light sources of the plurality of visible light sources and illuminating other visible light sources of the plurality of visible light sources.

9. A head-mounted device, comprising:
   an image sensor;
   a logic device configured to execute instructions; and
   a storage device comprising instructions executable by the logic device to
      receive image data from the image sensor,
      in the image data, detect a set of light sources of a plurality of visible light sources arranged on a handheld object, and
      send a control signal to the handheld object to modulate a brightness of one or more light sources of the plurality of light sources, the control signal being configured to apply different brightnesses to two or more visible light sources based on differences in locations of the two or more visible light sources on the handheld object.

10. The head-mounted device of claim 9, wherein the control signal is determined based on an apparent brightness of one or more of the light sources of the set of light sources in the image data.

11. The head-mounted device of claim 9, wherein the control signal is determined based upon one or more of a distance of the handheld object from head-mounted device and an angular location of the handheld object in a field of view of the image sensor.

12. The head-mounted device of claim 9, wherein the control signal is based on an orientation of the handheld object relative to the head-mounted device.

13. The head-mounted device of claim 9, wherein the control signal is configured to apply a same change in brightness to all visible light sources of the plurality of visible light sources.

14. The head-mounted device of claim 9, wherein the control signal is configured to turn off a subset of visible light sources and illuminate other visible light sources of the plurality of visible light sources based upon the subset being out of view of the image sensor.

15. A handheld object configured for providing user input to a head-mounted device, the handheld object comprising:
   a body;
   an inertial motion sensor configured to provide a motion signal related to changes in position and orientation of the handheld object;
   a plurality of visible light sources arranged on the body in an arrangement trackable by a vision system of the head-mounted device; and
   a controller configured to control a brightness of one or more visible light sources of the plurality of visible light sources based at least on the motion signal, and apply different brightnesses to two or more visible light sources based on differences in locations of the two or more visible light sources on the handheld object.

16. The handheld object of claim 15, wherein the controller is further configured to control a brightness of one or more visible light sources based on a signal from the head-mounted device.

17. The handheld object of claim 15, wherein the controller is configured to control a brightness of one or more visible light sources by changing a duty cycle of power provided to each of the one or more visible light sources.

18. The handheld object of claim 15, wherein the controller is configured to control a brightness of one or more visible light sources by turning off a subset of visible light sources of the plurality of visible light sources while illuminating another subset of visible light sources of the plurality of visible light sources.

* * * * *